(12) United States Patent
Hellesmark et al.

(10) Patent No.: US 12,162,772 B2
(45) Date of Patent: Dec. 10, 2024

(54) SYSTEM FOR OFFSHORE PRODUCTION OF FUEL

(71) Applicant: Stena Power & LNG Solutions AS, Grimstad (NO)

(72) Inventors: Svein Borge Hellesmark, Fevik (NO); Göran Hermansson, Gothenburg (NO)

(73) Assignee: Stena Power & LNG Solutions AS, Grimstad (NO)

( * ) Notice: Subject to any disclaimer, the term of this patent is extended or adjusted under 35 U.S.C. 154(b) by 0 days.

(21) Appl. No.: 18/610,757

(22) Filed: Mar. 20, 2024

(65) Prior Publication Data

US 2024/0217830 A1 Jul. 4, 2024

Related U.S. Application Data

(62) Division of application No. 18/334,860, filed on Jun. 14, 2023, now Pat. No. 11,970,404.

(Continued)

(51) Int. Cl.
*C01C 1/04* (2006.01)
*B01D 53/047* (2006.01)
(Continued)

(52) U.S. Cl.
CPC .......... *C01C 1/0447* (2013.01); *B01D 53/047* (2013.01); *B01D 53/229* (2013.01); *B01D 61/025* (2013.01); *B01D 61/08* (2013.01); *B01D 69/12* (2013.01); *B01D 71/56* (2013.01); *B01D 71/68* (2013.01); *B63B 21/50* (2013.01); *B63B 25/12* (2013.01); *B63B 27/34* (2013.01);

(Continued)

(58) Field of Classification Search
None
See application file for complete search history.

(56) References Cited

U.S. PATENT DOCUMENTS

2011/0081586 A1* 4/2011 McAlister ................. C25B 9/05
429/422
2019/0161146 A1 5/2019 Hellesmark et al.

FOREIGN PATENT DOCUMENTS

KR 20200049995 A 5/2020
KR 20220053060 A 4/2022
(Continued)

OTHER PUBLICATIONS

Sung et al, KR 20200049995, English Translation from IDS in U.S. Appl. No. 18/334,860 (Year: 2020).*
(Continued)

*Primary Examiner* — Colin W. Slifka
(74) *Attorney, Agent, or Firm* — Haynes and Boone, LLP

(57) ABSTRACT

A method and system for the offshore production of fuel includes an offshore marine platform on which is mounted an ammonia production unit. The ammonia production unit may produce ammonia utilizing raw materials sourced adjacent the marine platform, including seawater and electricity from offshore wind turbines. The produced ammonia may be subsequently liquified and transported away from the marine platform, or conveyed to a remote location via a seabed pipeline. A portion of the hydrogen produced as part of the ammonia production process may be utilized to operate onboard combustion turbines that can in turn drive electric generators onboard the marine platform to produce electricity.

16 Claims, 16 Drawing Sheets

Related U.S. Application Data

(60) Provisional application No. 63/366,409, filed on Jun. 15, 2022.

(51) Int. Cl.
| | |
|---|---|
| *B01D 53/22* | (2006.01) |
| *B01D 61/02* | (2006.01) |
| *B01D 61/08* | (2006.01) |
| *B01D 69/12* | (2006.01) |
| *B01D 71/56* | (2006.01) |
| *B01D 71/68* | (2006.01) |
| *B63B 21/50* | (2006.01) |
| *B63B 25/12* | (2006.01) |
| *B63B 27/34* | (2006.01) |
| *B63B 35/44* | (2006.01) |
| *C02F 1/44* | (2023.01) |
| *C02F 103/08* | (2006.01) |
| *C25B 1/04* | (2021.01) |
| *C25B 15/08* | (2006.01) |

(52) U.S. Cl.
CPC .............. *C02F 1/441* (2013.01); *C25B 1/04* (2013.01); *C25B 15/085* (2021.01); *B01D 2253/102* (2013.01); *B01D 2256/10* (2013.01); *B01D 2257/104* (2013.01); *B01D 2313/243* (2013.01); *B63B 2035/446* (2013.01); *C02F 2103/08* (2013.01); *C02F 2201/001* (2013.01); *C02F 2301/066* (2013.01)

(56) References Cited

FOREIGN PATENT DOCUMENTS

| KR | 20220053062 A | 4/2022 |
|---|---|---|
| WO | WO 2019/204857 A1 | 10/2019 |

OTHER PUBLICATIONS

Partial Search Report issued for International Patent Application No. PCT/NO2023/050141, dated Oct. 9, 2023, 10 pages, ISR/EP.
Partial Search Report issued for International Patent Application No. PCT/NO2023/050142, dated Nov. 20, 2023, 11 pages, ISR/EP.

* cited by examiner

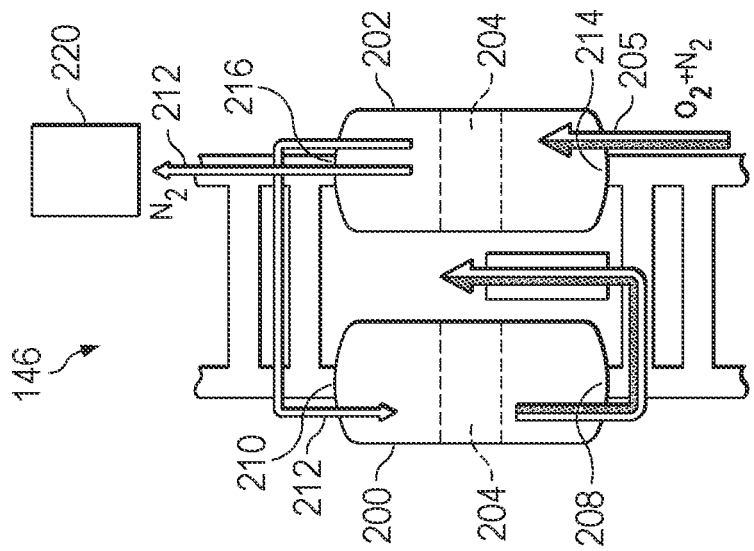
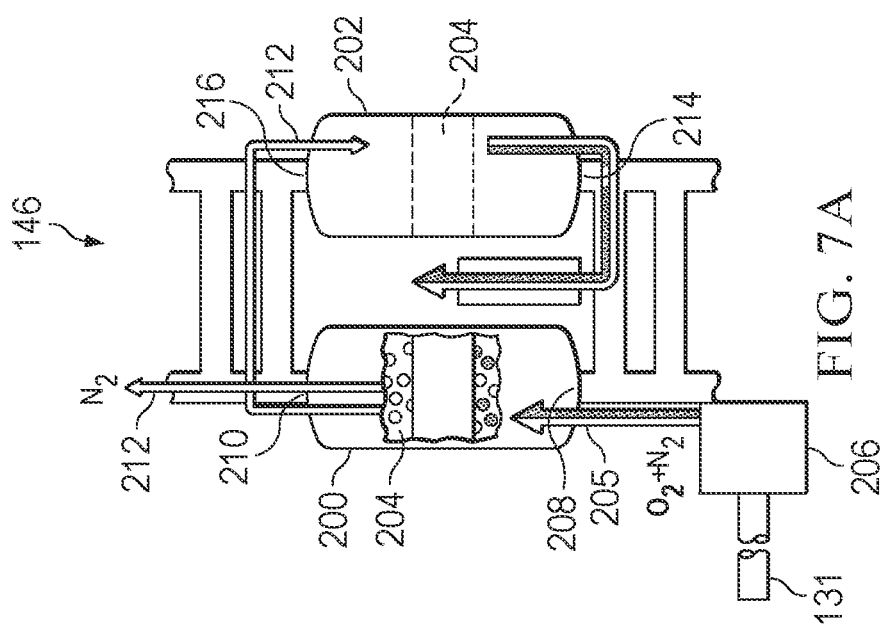
FIG. 7B
FIG. 7A

SYSTEM FOR OFFSHORE PRODUCTION OF FUEL

PRIORITY CLAIM

This application is a divisional of U.S. patent application Ser. No. 18/334,860, filed Jun. 14, 2023 which claims the benefit of priority to U.S. Provisional Application No. 63/366,409, filed Jun. 15, 2022 the benefit of which is claimed and the disclosure of which is incorporated by reference in its entirety.

FIELD OF THE INVENTION

The present disclosure generally relates to production of fuel for power generation, and more particularly to the production of hydrogen utilizing offshore fuel production facilities.

BACKGROUND OF THE INVENTION

It is known to use natural gas, which is predominantly made up of methane (CH4), for heating and generating electricity. In particular, natural gas may be burned as fuel in the combustion turbines to produce mechanical power that is converted to electric power by electric generators. However, upon combustion of the natural gas, carbon dioxide (CO2) is produced as a byproduct. The environmental impacts of greenhouse gases such as carbon dioxide are known, and therefore, there is a desire to reduce carbon dioxide emissions in the production of electricity by identifying other fuels for combustion turbines. In this regard, the use of hydrogen as an alternative fuel to natural gas in the production of electricity has been gaining traction.

One drawback to the use of hydrogen is the difficulty in transporting hydrogen. Because of the small size of hydrogen molecules when compared to methane molecules, traditional pipelines used for transporting methane may not be suitable for transporting hydrogen. As such, it has been proposed to liquify hydrogen using known liquefaction techniques in order to transport hydrogen in cryogenic storage tanks. However, one drawback to liquified hydrogen is that it has significantly less energy by volume than liquified natural gas (LNG), requiring shipment of a greater volume of liquified hydrogen to achieve the same the same energy output as LNG. One solution is to transport hydrogen in another form, namely as liquified ammonia (NH3). However, ammonia as a gas or liquified is toxic and therefore not readily handled or utilized due to the dangers of human exposure.

BRIEF DESCRIPTION OF THE DRAWINGS

For a more complete understanding of the present disclosure and its features and advantages, reference is now made to the following description, taken in conjunction with the accompanying drawings, in which:

FIGS. 7A and 7B illustrate one embodiment of a nitrogen production system to be used in the offshore marine system of FIG. 4.

DETAILED DESCRIPTION

Disclosed herein is a method and system for production of hydrogen fuel at an offshore marine platform where liquified ammonia is delivered and cracked in order to produce gaseous hydrogen, which gaseous hydrogen may be piped to an onshore location for use as fuel in the production of electricity, or alternatively, may be used at the offshore platform to produce electricity. In particular, an ammonia cracking system carried on a marine platform is semi-permanently installed offshore. A liquified ammonia storage unit may be positioned adjacent the marine platform to deliver bulk liquified ammonia to the platform for cracking. In one or more embodiments, a liquified ammonia floating storage unit and a floating liquified natural gas storage unit are positioned adjacent the marine platform to allow blending of produced hydrogen with natural gas prior to combustion or pipeline transfer. In other embodiments, the hydrogen fuel production system includes an offshore marine platform having a water purification unit for purifying seawater collected from adjacent the marine platform. The purified water is used in an onboard hydrogen production system to produce hydrogen. An onboard nitrogen production system is used to produce nitrogen, after which the in situ produced hydrogen and nitrogen are utilized by an onboard ammonia production system to produced liquified ammonia. In other embodiments, the hydrogen fuel production system includes an offshore marine platform having methane treatment system for conversion of methane into hydrogen for production of electricity onboard the marine platform. In yet other embodiments, the hydrogen fuel production system includes an offshore marine platform having a water purification unit for purifying seawater collected from adjacent the marine platform. The purified water is used in an onboard hydrogen production system to produce hydrogen. An onboard carbon dioxide source provides carbon dioxide for reaction with the produced hydrogen to form synthetic methane in a methanation reactor disposed onboard the marine platform.

Figure 1:
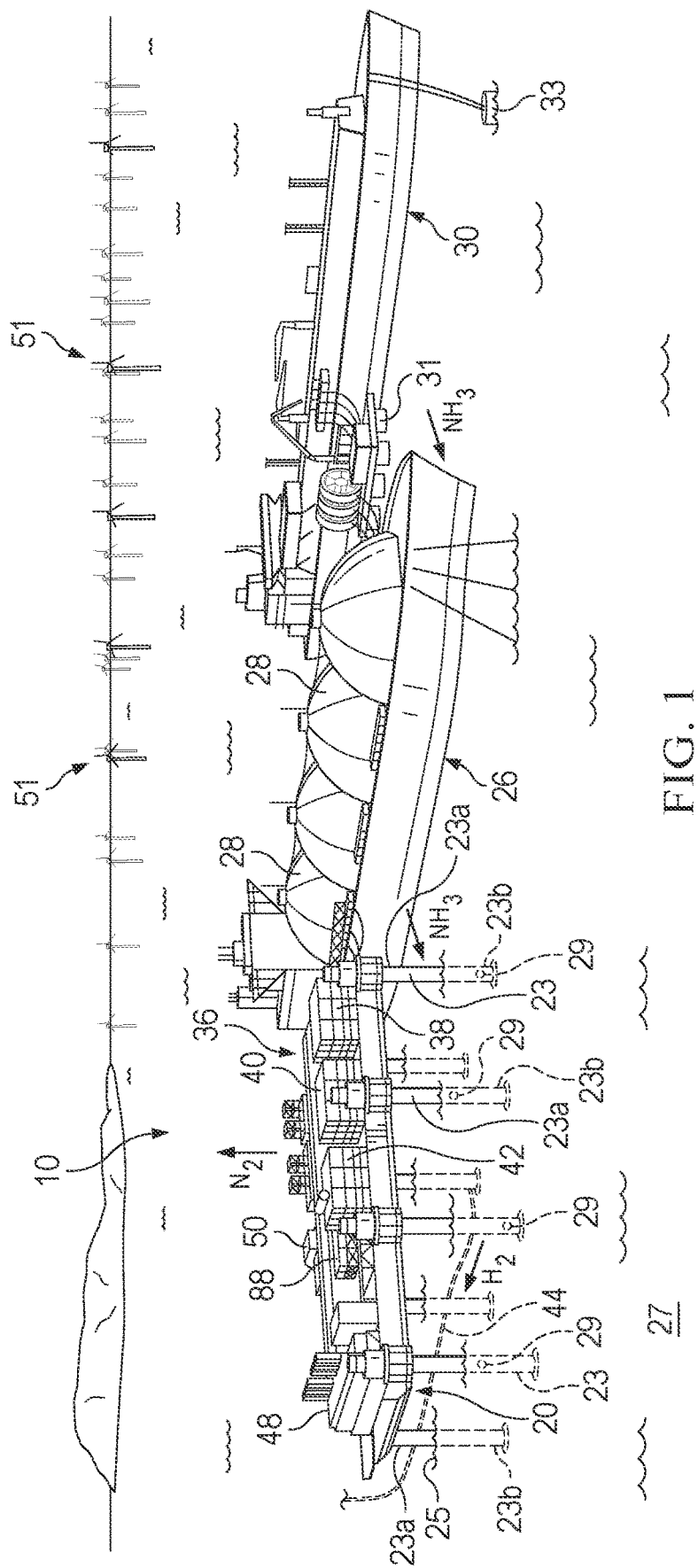
FIG. 1 is an offshore marine system for hydrogen production utilizing liquified ammonia.

With reference to FIG. 1, a hydrogen fuel production system 10 includes an offshore marine platform 20 disposed for receipt of liquified ammonia from a liquified ammonia storage unit 26 positioned on or adjacent to marine platform 20. In one or more embodiments, the liquified ammonia storage unit 26 is a liquified ammonia floating storage unit 26 moored adjacent the marine platform 20 and disposed to transfer liquified ammonia to marine platform 20 for processing into gaseous hydrogen fuel. The liquified ammonia floating storage unit 26 may include a plurality of bulk storage tanks 28 for receipt of liquified ammonia delivered from a liquified ammonia transport vessel 30. It will be appreciated that in some embodiments, the total liquified cargo storage capacity of the liquified ammonia transport vessel 30 is smaller than the total liquified ammonia storage capacity of the liquified ammonia storage unit 26 such that liquified ammonia storage unit 26 can be utilized as a collection or gather point for bulk storage of smaller volumes of liquified ammonia delivered by liquified ammonia transport vessel 30. Thus, liquified ammonia floating storage unit 26 has a first total liquified ammonia storage volume and liquified ammonia transport vessel 30 has a second total liquified ammonia storage volume that is less than the first total liquified ammonia storage volume. In such case, liquified ammonia floating storage unit 26 is utilized to gather a sufficient quantity of liquified ammonia onboard the liquified ammonia floating storage unit 26 before pumping the liquified ammonia from the liquified ammonia floating storage unit 26 to the offshore marine platform 20, wherein the quantity of liquified ammonia gathered on the floating storage unit 26 is greater than the total storage capacity of the liquified ammonia transport vessel 30.

In one or more embodiments, liquified ammonia transport vessel 30 may be moored at moorings 33 that are spaced apart from liquified ammonia floating storage unit 26 and marine platform 20. In such case, a floating transfer terminal 31 may be utilized to transfer liquified ammonia to the liquified ammonia floating storage unit 26 from the liquified ammonia transport vessel 30.

In one or more embodiments, marine platform 20 may be a jack-up platform, a semi-submersible platform, a barge, a buoyant vessel, a fixed platform, a spar platform, or a tension-leg platform which is fixed to the ocean floor or otherwise moored for long periods of deployment in a single location. In other embodiments, marine platform 20 may be a floating vessel such as a barge or ship that can be moored in place for long term deployment. Moreover, while marine platform 20 and liquified ammonia floating storage unit 26 are shown separately, they can be integrally formed either on the marine platform 20 or the floating storage unit 26. In either case, marine platform 20 and floating storage unit 26 may be relocatable in order to provide on-demand hydrogen to consumers via ammonia import, such as from liquified ammonia transport vessel 30 or a liquified ammonia floating storage unit 26.

In one or more embodiments, marine platform 20 includes at least one platform deck 21 and three or more platform legs 23, where each platform leg 23 has a first end 23a and a second end 23b. Platform deck 21 is disposed adjacent the first end 23a of each platform leg 123 and supported above the ocean surface 25. The second end 23b of each platform leg 123 may engage the seabed 27.

Hydrogen fuel production system 10 may include one or more seawater intakes 29 to draw in seawater for use in the hydrogen production process. While seawater intakes 29 are not limited to a particular system for drawing in seawater, in one or more embodiments, one or more seawater intake(s) 29 may be disposed adjacent the second end 23b of a platform leg 23 of marine platform 20 to draw in cooler water from the adjacent body of seawater, while in other embodiments, seawater intake 29 is disposed between the first and second leg ends 23a, 23b, respectively, of a platform leg 23, adjacent the ocean surface 25, to draw in warmer water from the adjacent body of seawater. The vertical height of seawater intake 29 may be adjusted based on the season to ensure the seawater used in a particular process onboard marine platform 20 is at an optimum temperature. In yet other embodiments, a first plurality of seawater intakes 29 may be disposed adjacent the second end 23b of one or more platform legs 23 and a second plurality of seawater intakes 29 may be spaced apart from the second end 23b of one or more platform legs 23. In other words, the first plurality of seawater intakes 29 may be a first distance from the second end 23b of one or more platform legs 23 and the second plurality of seawater intakes 29 may be a second distance from the second end 23b of one or more platform legs 23, where the second distance is greater than the first distance. In some embodiments, the second distance may be at least twice the first distance so that seawater in different thermoclines may be used in the processes onboard marine platform 20, taking advantage of warmer mixed water at the surface and the cooler deep water below.

Disposed on marine platform 20 is an ammonia cracking system 36. Ammonia cracking system 36 need not be limited to a particular type of system for ammonia cracking, however, in FIG. 1, ammonia cracking system 36 includes a cracking reactor 40 which produces hydrogen (H2) and nitrogen (N2) from the liquified ammonia delivered to marine platform 20 by liquified ammonia transport vessel 30 and stored on liquified ammonia floating storage unit 26. In some embodiments, ammonia cracking system 36 may also include a pretreatment unit 38 for converting liquified ammonia to gaseous ammonia prior to cracking. In one or more embodiments, the pretreatment unit 38 may be an expansion valve wherein liquified ammonia converts to gaseous ammonia as the ammonia passes through the expansion valve. In one or more other embodiments, pretreatment unit 38 may be a heat exchanger for heating liquified ammonia, i.e., cryogenic ammonia, pumped from floating storage unit 26. Upon heating, the liquified ammonia converts into gaseous ammonia. Thus, pretreatment unit 38 may be considered a regasification unit for converting liquified ammonia to gaseous ammonia. In any event, following gasification, the ammonia is introduced into cracking reactor 40 which produces a product gas mixture of hydrogen and nitrogen from the gaseous ammonia. Although not necessary, thereafter, the product gas mixture may be introduced into a hydrogen purification unit 42 onboard marine platform 20 in order to produce purified hydrogen from the product gas mixture.

At this point, the produced hydrogen, either as purified hydrogen or a product gas mixture, may be transmitted to an onshore or near shore location or terminal via a conveyance system 44, such as the illustrated hydrogen gas pipeline 44. Alternatively, or in addition thereto, all or a portion of the produced hydrogen may be conveyed to an on board electrical production system and utilized onboard marine platform 20 to generate electricity. In other words, a first portion of the produced hydrogen may be transmitted via pipeline 44 while a second portion of the produced hydrogen may be utilized onboard marine platform 20 for power production. Thus, in one or more embodiments, marine platform 20 may include one or more combustion turbines 48 for combusting at least a portion of the produced hydrogen to provide mechanical power that is converted to electric power by one or more electric generators 50. In this regard, the combustion turbines 48 are in fluid communication, either directly or indirectly, with the ammonia cracking system 36 or hydrogen purification unit 42 in order to utilize at least a portion of the produced hydrogen for fuel in the combustion turbines 148. Nitrogen from the hydrogen purification unit 42 may be released into the atmosphere. Additionally, in one or more embodiments, heat produced from the combustion turbines 48 may be utilized by ammonia cracking system 36, as a heat source for pretreatment unit 38 and/or cracking reactor 40 or for other heating purposes. Likewise, electricity produced from the electric generators 50 may be utilized by ammonia cracking system 36 to operate ammonia cracking system 36. Alternatively, or in addition thereto, a plurality of offshore wind turbines 51 in the vicinity of marine platform 20 may be electrically coupled to the marine platform 20 in order to provide electricity to marine platform 20 for various processes, which may include in some embodiments, electricity for ammonia cracking system 36.

Figure 2:
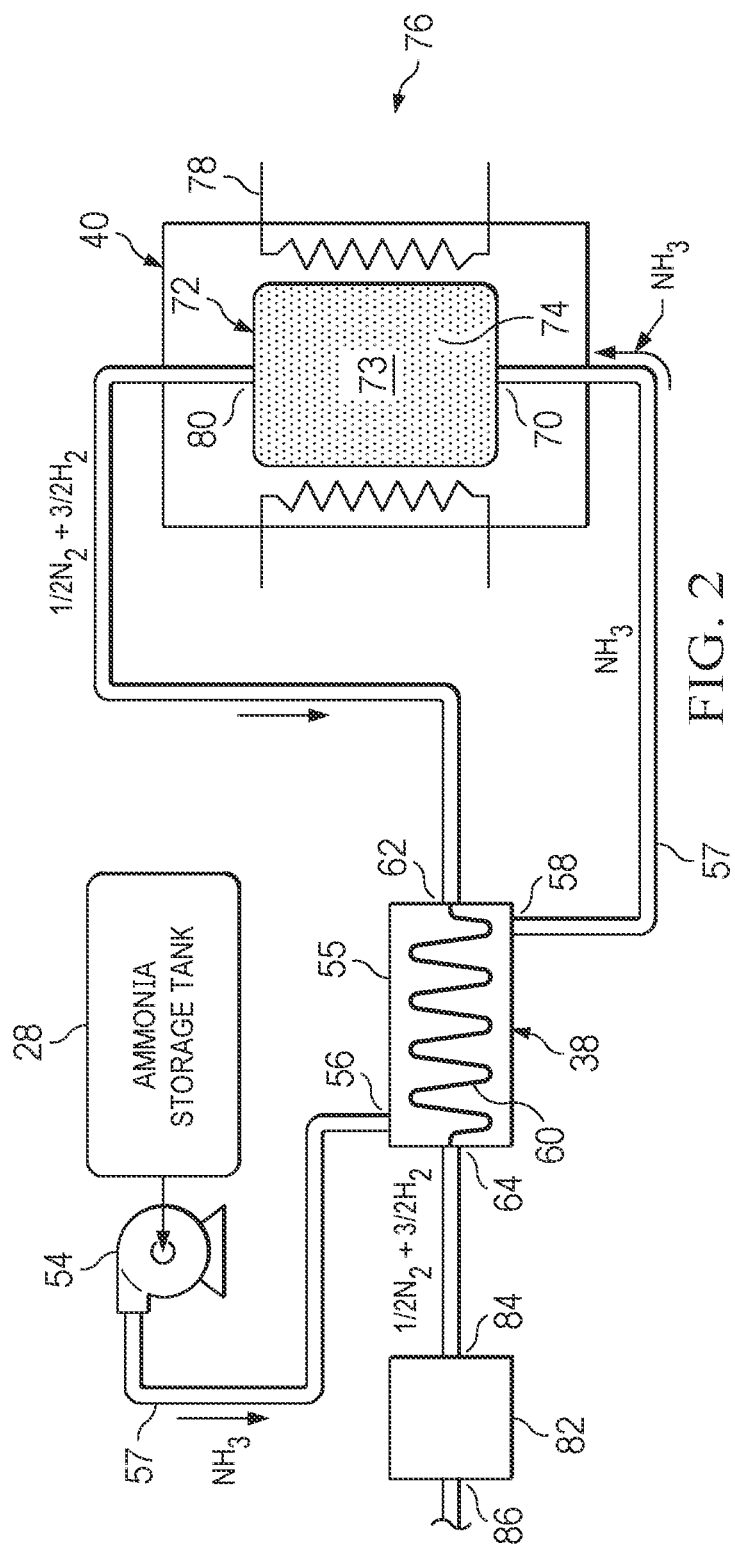
FIG. 2 is one embodiment of an ammonia cracking system to be used in the offshore marine system of FIG. 1.

Turning to FIG. 2, one embodiment of ammonia cracking system 36 is illustrated in more detail by a flow diagram. In particular, a cryogenic pump 54 is utilized to pump liquified ammonia along a flowline 57 from a cryogenic storage tank 28, such as may be carried on liquified ammonia floating storage unit 26, to cracking reactor 40. In one or more embodiments, a pretreatment unit 38 may be disposed along flowline 57. In the illustrated embodiment of FIG. 2, pretreatment unit 38 is shown as heat exchanger 38 that is utilized to convert the liquified ammonia to gaseous ammonia. Heat exchanger 38 includes a vessel 55, with a liquified ammonia inlet 56, and a gaseous ammonia outlet 58. Although not necessary, as shown, in some embodiments, heated product gas mixture from cracking reactor 40 may be used to provide heat to heat exchanger 38. In other embodiments heat to heat exchanger 38 may be provided from another source, such as the combustion gases from operation of combustion turbines 48. Moreover, while heat exchanger 38 is shown as separate from cracking reactor 40, in other embodiments, heat exchanger 38 may be integrally formed as part of cracking reactor 40. In any event, heat exchanger 38 is not limited to a particular type of heat exchanger. In the illustrated embodiment, vessel 55 includes a heat exchange mechanism 60, such as tubes, plates or the like, with heated nitrogen gas and heated hydrogen gas introduced into the heat exchange mechanism 60 at inlet 62 and discharged from heat exchange mechanism 60 at outlet 64.

Gaseous ammonia from pretreatment unit 38, whether a heat exchanger or expansion valve or other device, is introduced into cracking reactor 40 via gaseous ammonia inlet 70. Cracking reactor 40 includes a reactor vessel 72 where gaseous ammonia is dissociated in a reaction chamber 73. In one or more embodiments, cracking reactor 40 may be a catalytic cracking reactor 40 having a catalyst 74 disposed therein. In one or more embodiments, catalyst 74 may be nickel or other metallic catalyst, but may be any other type of catalyst. In any event, heat from a heat source 76 is applied to reactor vessel 72 to supply heat to reaction chamber 73. In some embodiments, the heat from heat source 76 may be applied via a heat exchanger 78 disposed adjacent reactor vessel 72. In one or more embodiments, the heat source 76 may be heating coils or elements disposed adjacent reactor vessel 72. It will be understood that the disclosure is not limited to a particular type of cracking reactor, nor individual components thereof described herein.

As is known in the industry, gaseous ammonia is dissociated within cracking reactor 40 to yield a product gas mixture of hydrogen and nitrogen, which gaseous product mixture exits cracking reactor 40 via a product gas outlet 80.

In one or more embodiments, the product gas mixture exiting cracking reactor 40 via product gas outlet 80 can then be introduced into a hydrogen purification unit 82 for further processing. Specifically, hydrogen purification unit 82 may include an inlet 84 in fluid communication with the product gas outlet 80 of the cracking reactor 40. In other embodiments, as illustrated, the gaseous product mixture from cracking reactor 40 may first be utilized in heat exchanger 38 to preheat liquified ammonia from cryogenic storage tanks 28 before the gaseous product mixture is introduced into hydrogen purification unit 82.

Although hydrogen purification unit 82 is preferred in some embodiments, it will be appreciated that the disclosure is not limited to use of a hydrogen purification unit. Moreover, the disclosure is not limited to a particular type of hydrogen purification unit. Thus, hydrogen purification unit 82 may include, but is not limited to, a pressure swing adsorption (PSA) system having two or more pressure vessels with at least a nitrogen absorbent in each vessel; a membrane separation system utilizing gaseous mixture flow through a membrane to separate hydrogen from nitrogen; a electrochemical separation system; and a distillation system.

In any event, purified hydrogen exits hydrogen purification unit 82 through outlet 86. In one or more embodiments, outlet 86 is in fluid communication with pipeline 44, either directly or indirectly through a pumping unit 88 (see FIG. 1) disposed to increase pressure of the purified hydrogen for transmission to another location via pipeline 44. In one or more other embodiments, outlet 86 may also be in fluid communication with one or more combustion turbines 48 mounted on marine platform 20 so that a portion of the produced hydrogen can be utilized as fuel in the combustion turbines 48 in order to generate electricity and/or heat for use in the cracking process described herein.

In some embodiments, rather than conveying hydrogen produced by ammonia cracking to shore, all of the produced hydrogen may be combusted or burned in combustion turbines 48 to produce electricity by electric generators 50, which electricity may then be transmitted to remote location via conveyance system 44, in which case, conveyance system 44 may be an electrical cable. Alternatively, conveyance system may include both a pipeline for conveying a first portion of the hydrogen produced on marine platform 20 and an electrical cable for conveying electricity produced on marine platform 20 using a second portion of the hydrogen produced on marine platform 20. This may be desirable where more electricity is generated by marine platform 20 than is required for the cracking operations described herein. In such case, the excess electricity, along with produced hydrogen, may be conveyed to an onshore or nearshore location for distribution and/or use.

Figure 3:
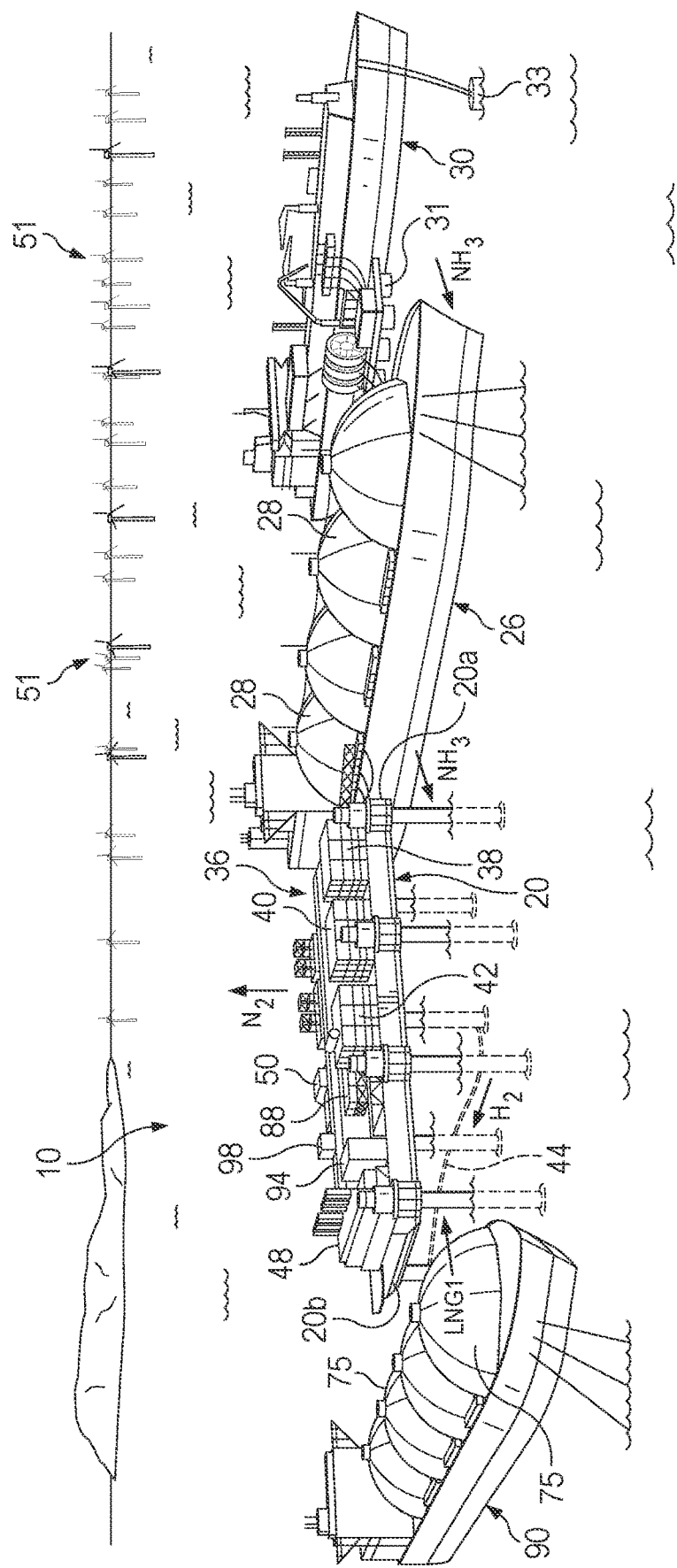
FIG. 3 is the offshore marine system of FIG. 1 with a liquified natural gas floating storage unit and blending unit for the production of blended fuel.

With reference to FIG. 3, in one or more embodiments, in addition to an ammonia cracking system 36, marine platform 20 may further include an LNG regasification unit 96 and a blending unit 98 disposed to receive gaseous hydrogen and gaseous natural gas and produce a blended natural gas. In this regard, in addition to liquified ammonia storage unit 26 provided at marine platform 20, such as the liquified ammonia floating storage unit 26 shown moored adjacent the marine platform 20, a liquified natural gas floating storage unit 90 may also be provided at marine platform 20. In the illustrated embodiment, liquified natural gas floating storage unit 90 is shown as a liquified natural gas floating storage unit 90 moored adjacent the marine platform 20 and having bulk storage tanks 92 for receipt of liquified natural gas (LNG1) delivered from an external source 94, such as a liquified natural gas transport vessel. The amount of hydrogen in the delivered natural gas may be minimal, such as less than 0.5% in some embodiments, or less than 1% in other embodiments or less than 3% in yet other embodiments. In still other embodiments, the percentage of hydrogen in the delivered natural gas is simply less than a desired percentage of hydrogen in a blended fuel. In any event, hydrogen fuel production system 10 therefore includes a first pump to transfer by pumping the delivered liquified natural gas LNG1 from liquified natural gas floating storage unit 90 to marine platform 20 for blending, and a second pump to transfer by pumping delivered liquified ammonia from floating storage unit 26 to marine platform 20 for ammonia cracking.

In some embodiments where blending is taking place on marine platform 20, marine platform 20 may have at least a first side 20*a* and a second side 20*b* with liquified ammonia floating storage unit 26 moored adjacent the first side 20*a* of marine platform 20 and liquified natural gas floating storage unit 90 moored adjacent the second side 20*b* of marine platform 20. In any event, LNG regasification unit 96 is utilized to convert the delivered liquified natural gas back into gaseous natural gas, after which the natural gas can be blended with the purified hydrogen in blending unit 98 to produce a blended fuel having a higher percentage of hydrogen than the originally delivered LNG1. In other words, LNG1 as delivered may have a first percentage of hydrogen and the blended fuel (LNG2) may have a second percentage of hydrogen that is higher than the first percentage of hydrogen.

The blended fuel can then be transmitted so another location via pipeline 44 and/or combusted as fuel in combustion turbines 48. In one or more embodiments, purified hydrogen may be transmitted via pipeline 44 while blended fuel may be utilized onboard marine platform 20 in combustion turbines 48. It will be appreciated that combustion turbines 48 may not be rated or designed to combust purified hydrogen, and thus the need for blending at marine platform 20, but unblended purified hydrogen may be desired at another location, thus the transmission of unblended, purified hydrogen via pipeline 44.

In some embodiments, rather than conveying purified hydrogen or blended fuel from marine platform 20, all of the produced hydrogen, whether blended or not, may be burned in combustion turbines 48 to produce electricity by electric generators 50, which electricity may then be transmitted to remote location via conveyance system 44, in which case, conveyance system 44 may be an electrical cable. Alternatively, conveyance system may include both a pipeline for conveying a first portion of the hydrogen produced on marine platform 20 (either as purified hydrogen or blended fuel) and an electrical cable for conveying electricity produced on marine platform 20 using a second portion of the hydrogen produced on marine platform 20 and blended with the delivered natural gas LNG1. This may be desirable where more electricity is generated by marine platform 20 than is required for the ammonia cracking operations described herein. In such case, the excess electricity, along with produced hydrogen and/or blended natural gas, may be conveyed to an onshore or nearshore location for distribution and/or use.

It will be appreciated that the above-described system is desirable because it moves the handling of toxic ammonia away from populated areas, reducing the dangers associated with handling of ammonia. Moreover, it provides a solution to the bulk transport and storage of ammonia at a hydrogen fuel production system prior to dissociation in the production of hydrogen fuel.

Figure 4:
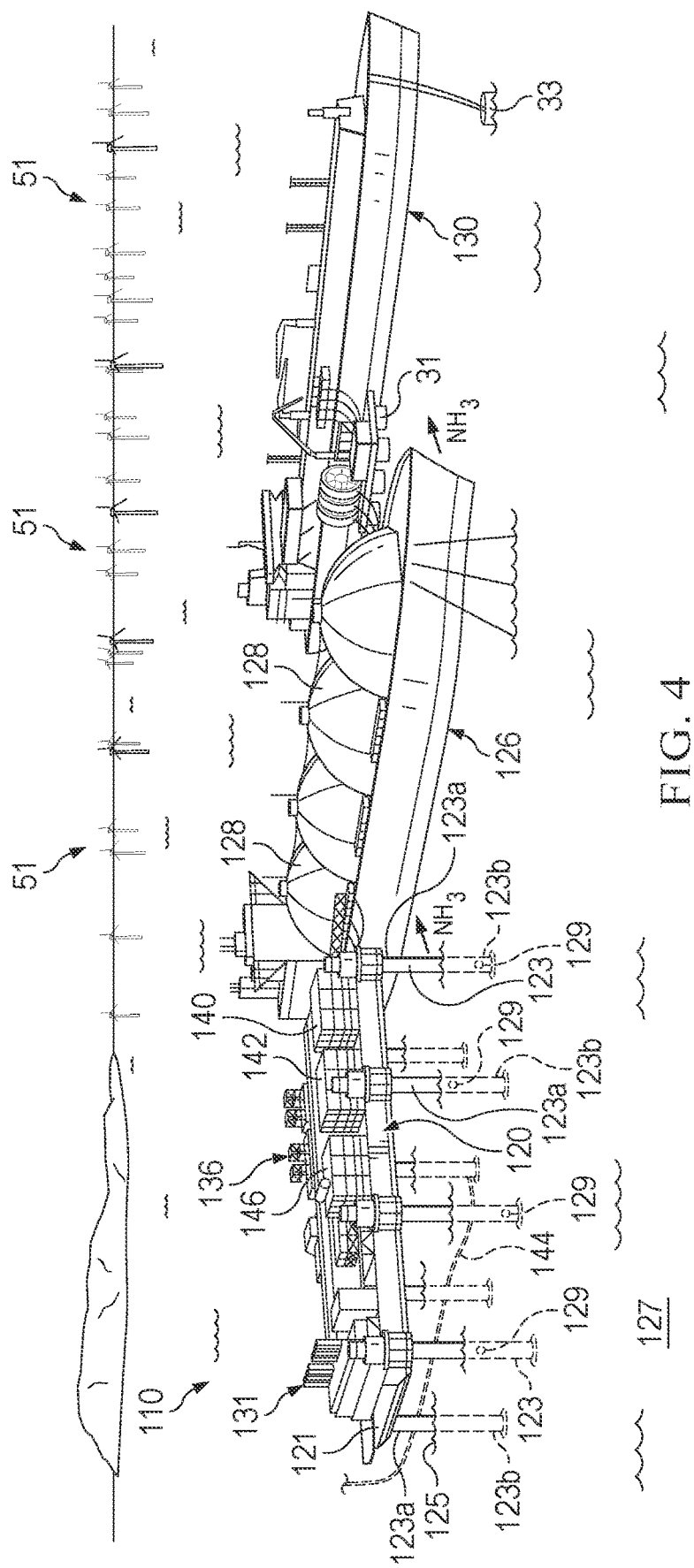
FIG. 4 is an offshore marine system for ammonia production and storage.
Figure 5:
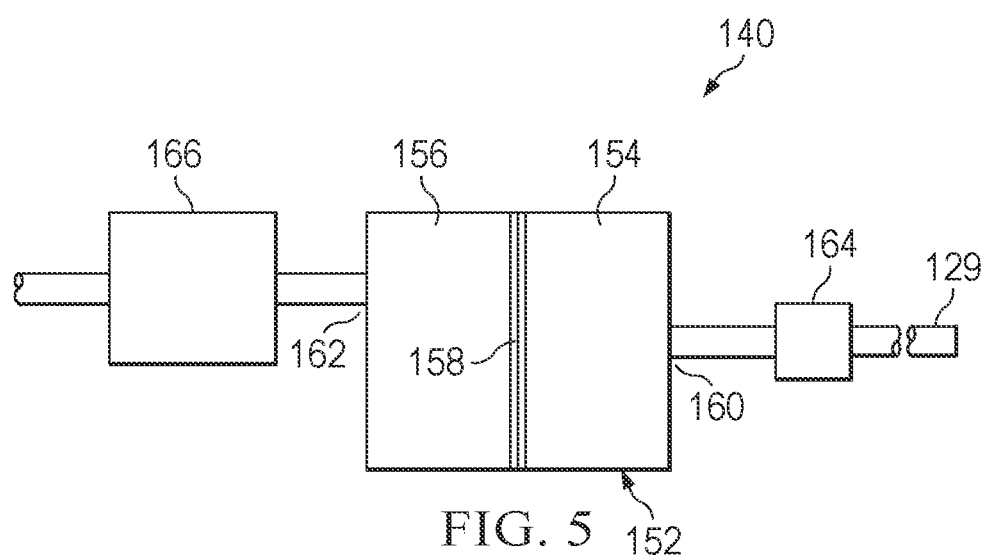
FIG. 5 is one embodiment of a water purification unit to be used in the offshore marine system of FIG. 4.

Turning to FIG. 4, another embodiment of hydrogen fuel production system 110 is shown in which a marine platform 120 is positioned offshore and includes an ammonia production system 136 for the production of liquified ammonia, which liquified ammonia is then bulk stored in a liquified ammonia storage unit 126 on or adjacent marine platform 120. In one or more embodiments, liquified ammonia storage unit 126 is a liquified ammonia floating storage unit 126 and may include a plurality of bulk storage tanks 128 for receipt of liquified ammonia produced onboard marine platform 120. In the illustrated embodiment, liquified ammonia produced at marine platform 120 and stored in bulk by liquified ammonia floating storage unit 126 can be transferred to a liquified ammonia transport vessel 130 for transport to other locations. Hydrogen fuel production system 10 therefore includes a first pump to transfer by pumping the produced liquified ammonia NH3 from marine platform 20 to floating storage unit 26.

In one or more embodiments, marine platform 120 may be a jack-up platform, a semi-submersible platform, a barge, a buoyant vessel, a fixed platform, a spar platform, or a tension-leg platform which is fixed to the ocean floor or otherwise moored for long periods of deployment in a single location. In other embodiments, marine platform 120 may be a floating vessel such as a barge or ship that can be moored in place for long term deployment. In other embodiments, marine platform 120 may be a floating vessel such as a barge or ship. Moreover, while marine platform 120 and liquified ammonia floating storage unit 126 are shown separately, they can be integrally formed either on the marine platform 120 or the liquified ammonia floating storage unit 126. Electricity may be provided to marine platform 120 for the production of ammonia by offshore wind turbines 51 disposed in the vicinity of marine platform 120.

In one or more embodiments, marine platform 120 includes at least one platform deck 121 and three or more platform legs 123, where each leg 123 has a first end 123*a* and a second end 123*b*. Platform deck 121 is disposed adjacent the first end 123*a* of each platform leg 123 and supported above the ocean surface 125. The second end 123*b* of each platform leg 123 may engage the seabed 127.

While they may be spaced apart from one another, in one or more embodiments, liquified ammonia floating storage unit 126 is moored in close proximity to the marine platform 120 so that a continuous flow of liquified ammonia can be maintained therebetween as the liquified ammonia is produced without the need for an intermediate storage, it being understood that in instances where ammonia production unit 136 has a low output volume, the low volume may not allow the liquid to be readily pumped to a storage unit that is a distance removed from the marine platform 120 or directly to a liquified ammonia transport vessel 130. In this regard, liquified ammonia floating storage unit 126 is desirable because it can be utilized as a collection reservoir for liquified ammonia produced onboard marine platform 120 until a sufficient quantity of liquified ammonia has been produced for transport to another location by liquified ammonia transport vessel 130. In this regard, liquified ammonia floating storage unit 126 has a first total liquified ammonia storage volume and liquified ammonia transport vessel 130 has a second total liquified ammonia storage volume that is less than the first total liquified ammonia storage volume.

In any event, ammonia production system 136 utilizes hydrogen (H2) and nitrogen (N2) sourced onboard marine platform 120 to produce the liquified ammonia. In one or more embodiments, marine platform 120 includes a water purification unit 140, a hydrogen production system 142, and a nitrogen production system 146, where the hydrogen production system 142 utilizes purified water from the water purification unit 140 to produce hydrogen for use in the ammonia production system 136.

While not limited to a particular water purification unit, in some embodiments, water purification unit 140 utilizes reverse osmosis and includes a water purification vessel 152 having a first chamber 154 and a second chamber 156 with a semi-permeable membrane 158 disposed between the first and second chambers 154, 156. A seawater inlet 160 is provided in the first chamber 154 and a purified water outlet 162 is provided in the second chamber 156. Water purification unit 140 also includes a pump 164 for pressurizing the seawater in the first chamber 154. Pump 164 is in fluid communication with a seawater intake 129 to draw in seawater for purification.

With reference back to FIG. 4, in one or more embodiments, seawater intake 129 is disposed adjacent the second end 123b of a platform leg 123 of marine platform 120 to draw in cooler water from the adjacent body of seawater, while in other embodiments, seawater intake 129 is disposed between the first and second leg ends 123a, 123b, respectively, of a platform leg 123, adjacent the ocean surface 125, to draw in warmer water from the adjacent body of seawater.

While semi-permeable membrane 158 may be any membrane known for use in reverse osmosis, in one or more embodiments, semi-permeable membrane 158 may be a thin polyamide layer (<200 nm) deposited on top of a polysulfone porous layer (about 50 microns) on top of a non-woven fabric support sheet and having a pore size of approximately 0.0001 micron. Seawater drawn in and pumped to the water purification unit 140 where the water purification unit 140 is utilized to at least partially purifying the pumped seawater to yield purified water, after which, the hydrogen production system 142 is used to generate gaseous hydrogen from the purified water. In one or more embodiments, a purified water storage vessel 166 is fluidically disposed between the purified water outlet 162 of the water purification unit 140 and the hydrogen production system 142.

Figure 6:
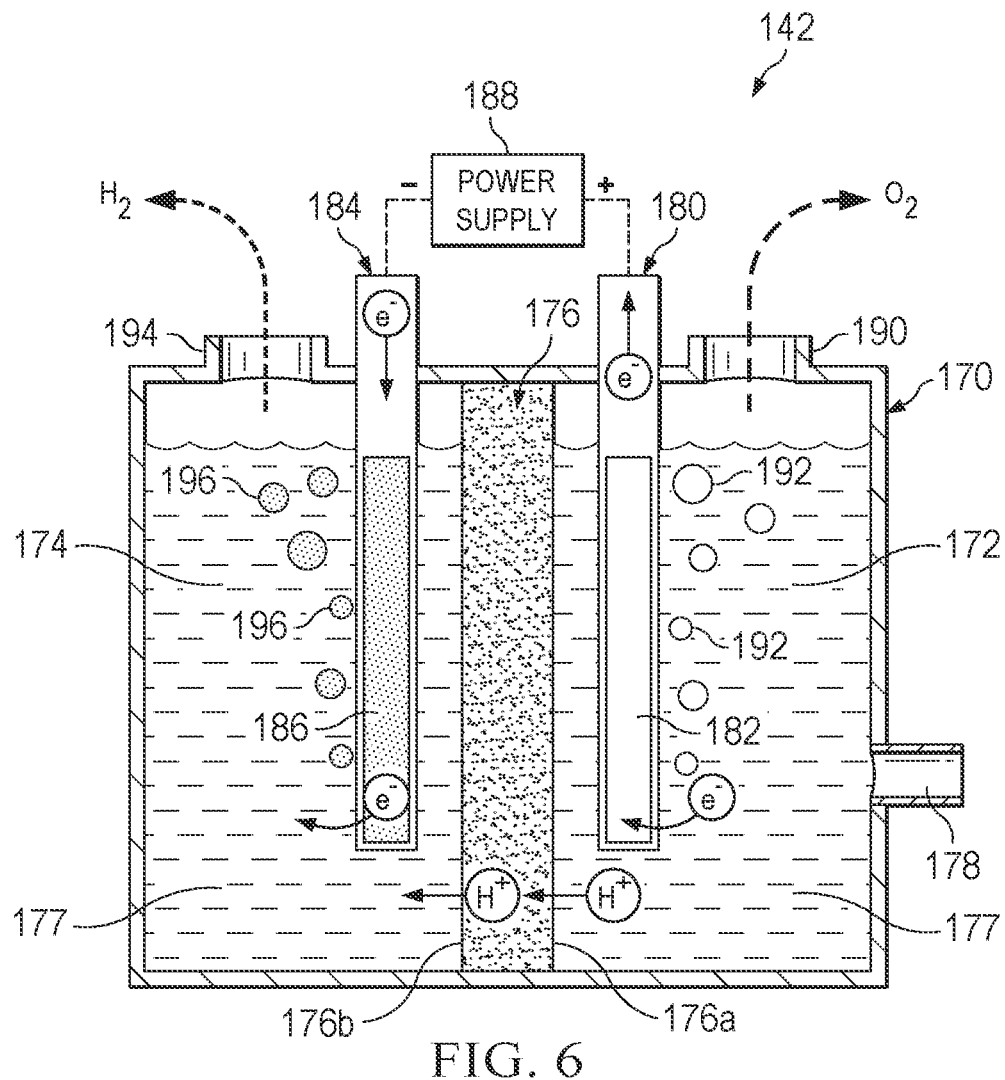
FIG. 6 is one embodiment of a gaseous hydrogen production system to be used in the offshore marine system of FIG. 4.

Turning to FIG. 6, while not limited to a particular hydrogen production system, in some embodiments, hydrogen production system 142 utilizes electrolysis to produce hydrogen. Thus, in the illustrated hydrogen production system 142, a hydrogen production vessel 170 is provided, having a first chamber 172 and a second chamber 174 with a membrane 176 disposed between the first and second chambers 172, 174. While not limited to a particular type of membrane, in one or more embodiments, membrane 176 is a proton exchange membrane (PEM) or alkaline membrane. However, other membranes may also be utilized. In any event, purified water 177 from water purification unit 140 is delivered to hydrogen production vessel 170 via a purified water inlet 178 provided in hydrogen production vessel 170. An anode assembly 180 having an anode 182 extending into first chamber 172 is provided on a first side 176a of the membrane 176, and a cathode assembly 184 having a cathode 186 extending into second chamber 174 is provided on a second side 176b of membrane 176. A power supply 188 electrically couples anode assembly 180 and cathode assembly 184. As will be appreciates, purified water 177 may be provided in either first chamber 172, second chamber 174 or both, depending on the hydrogen production system 142. Relatedly, a purified water inlet 178 may likewise be provided in either first chamber 172, second chamber 174 or both. In any event, an oxygen outlet 190 is provided in first chamber 172 for allowing oxygen 192 to pass therethrough, and a hydrogen outlet 194 is provided in second chamber 174 for allowing hydrogen 196 to pass therethrough. In one or more embodiments, electricity is provided to power supply 188 from wind turbines 51 (see FIG. 4), while in other embodiments, electricity may be provided to power supply 188 from another source, such as electric generators disposed onboard marine platform 120.

Figure 8:
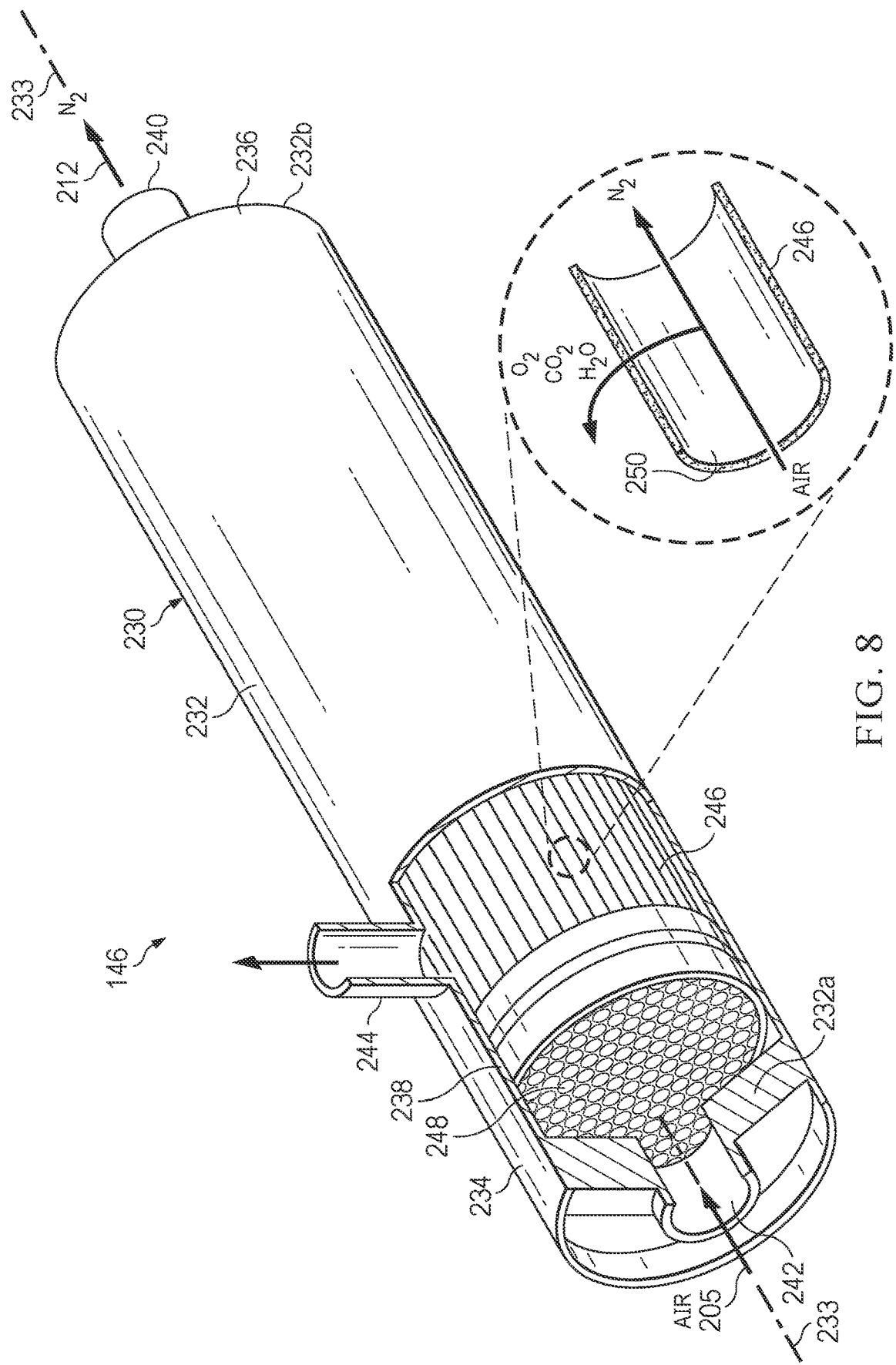
FIG. 8 is another embodiment of a nitrogen production system to be used in the offshore marine system of FIG. 4.

Turning to FIGS. 7 and 8, marine platform 120 also includes a nitrogen production system 146. Although not limited to a particular nitrogen production system, one embodiment of nitrogen production system 146 is shown in FIG. 7 as a pressure swing adsorption (PSA) nitrogen production system, and another embodiment of nitrogen production system 146 is shown in FIG. 8 as a membrane nitrogen production system. Nitrogen production system 146 may also utilize cryogenic distillation as is known in the art.

Nitrogen production system 146 includes at least one nitrogen production pressure vessel 200. In some embodiments, as illustrated in FIGS. 7A and 7B, nitrogen production system 146 includes two or more pressure vessels, such as a first pressure vessel 200 and second pressure vessel 202. Regardless of the number of pressure vessels, each pressure vessel 200, 202 of nitrogen production system 146 includes an absorbent assembly 204 disposed to absorb oxygen O2 from a pressurized air stream 205 delivered to pressure vessel 200 by an air compressor 206. Absorbent assembly 204 may be formed of any material utilized to absorb or remove oxygen from air stream 205, and may include an absorbent bed or absorbent membrane as is known in the art. For example, absorbent assembly may be a carbon absorbent bed having a carbon molecular sieve. First pressure vessel 200 includes at least a first port 208 into which pressurized air stream 205 enters first pressure vessel 200. First pressure vessel 200 includes at least a second port 210 from which a nitrogen stream 212 leaves first pressure vessel 200. Likewise, second pressure vessel 202 includes at least a first port 214 into which pressurized air stream 205 enters second pressure vessel 202. Second pressure vessel 202 includes at least a second port 216 from which a nitrogen stream 212 leaves second pressure vessel 202. Various piping, valves and additional ports may be utilized as is known in the art. It will be appreciated that as the flow into a pressure vessel 200, 202 is reversed, the applicable first port 208, 214, respectively, may be used to flush the absorbent assembly 204 utilizing a flushing fluid, such as a portion of the nitrogen stream 212, injected into a pressure vessel 200, 202 utilizing the respective second ports 210, 216. FIG. 7A illustrates first pressure vessel 200 producing a nitrogen stream 212 while second pressure vessel 202 is flushed using a portion of nitrogen stream 212, while FIG. 7B illustrates second pressure vessel 202 producing a nitrogen stream 212 while first pressure vessel 200 is flushed using a portion of nitrogen stream 212. In one or more embodiments, nitrogen stream 212 may then be directed to an additional nitrogen purification system 220 as is known in the art.

In one or more embodiments, marine platform 120 may include a process air intake 131 (see FIG. 4) that is in fluid communication with air compressor 206. In some embodiments, process air intake 131 is spaced apart from the platform deck 121 above the platform deck 121 to take in dryer, warmer air for use by nitrogen production system 146, while in other embodiments, process air intake 131 is positioned below the platform deck 121 above the ocean surface 125 to take in cooler air when denser input air is desired for use with nitrogen production system 146.

With reference to FIG. 8, in other embodiments, nitrogen production system 146 may include a nitrogen production reaction vessel 230 formed of an elongated cylinder 232 formed along a primary axis 233 having a first end 234 and a second end 236 with a cylinder wall 238 extending between the first end 234 and the second end 236. Elongated cylinder 232 is enclosed by a first end wall 232a enclosing the first end 234 of elongated cylinder 232 and a second end wall 232b enclosing the second end 236 of elongated cylinder 232.

Nitrogen production reaction vessel 230 has a nitrogen gas outlet 240 at the second end 236 of cylinder 232, a compressed air inlet 242 at the first end 234 of cylinder 232 and in fluid communication with the at least one air compressor 206 (see FIG. 7A), and a byproduct outlet 244. In or more embodiments, nitrogen gas outlet 240 is disposed in the second end wall 232b and compressed air inlet 242 is disposed in the first end wall 232a, with byproduct outlet 244 disposed in cylinder wall 238.

A polymer fiber membrane 246 is disposed in the reaction vessel 230 between the compressed air inlet 242 and the byproduct outlet 244. In one or more embodiments, the cylinder wall 238 defines an interior 248 of elongated cylinder 232, wherein the compressed air inlet 242 is disposed axially at the first end 234 of the cylinder 232 and the nitrogen gas outlet 240 is disposed axially at the second end 236 of the cylinder 232 and the byproduct outlet 244 is disposed in the cylinder wall 238 radially outward from the primary axis 233. In the illustrated embodiment of FIG. 8, compressed air stream 205 is introduced into the interior 248 of the cylinder 232. Under pressure, oxygen is driven radially outward through membrane 246 to outlet 244 while nitrogen stream 212 continues to flow longitudinally along cylinder 232 to nitrogen gas outlet 240. In one or more embodiments, the polymer fiber membrane 246 is formed into a plurality of axially extending, elongated tubes 250 parallel with primary axis 233 and disposed in the interior 248 of elongated cylinder 232. In one or more embodiments, polymer fiber membrane 246 is disposed about the interior surface of the cylinder wall 238, while in other embodiments, polymer fiber membrane 246 forms a column or bed between the first end 234 and the second end 236 of the elongated cylinder 232.

Figure 9:
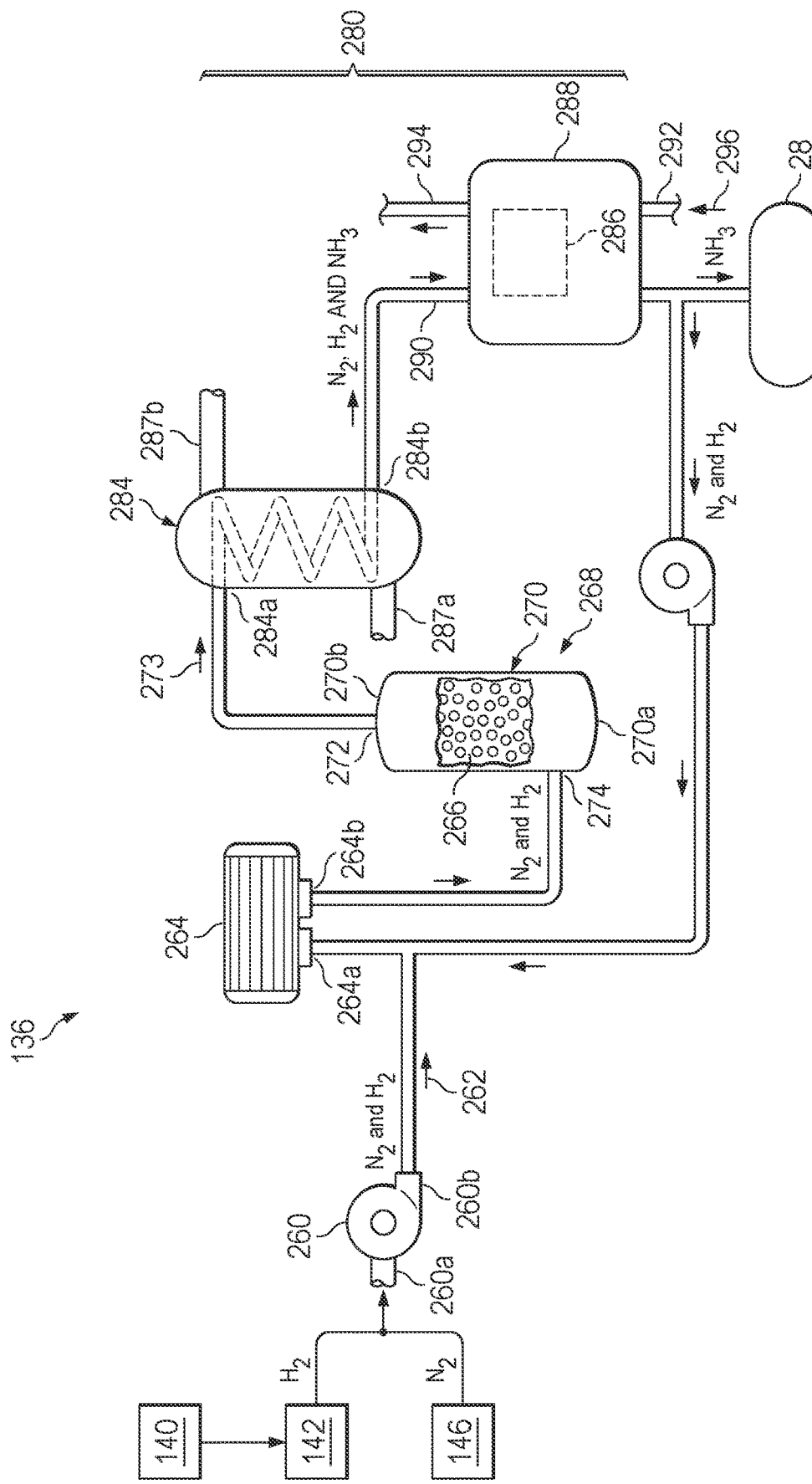
FIG. 9 is one embodiment of an ammonia production system to be used in the offshore marine system of FIG. 4.

While it will be appreciated that the disclosure is not limited to a particular ammonia production system 136, FIG. 9 illustrates one embodiment of ammonia production system 136. Nitrogen gas from nitrogen production system 146 and hydrogen gas from hydrogen production system 142 pressurized by one or more compressors 260 having a feed gas inlet 260a and a compressed feed gas outlet 260b. In one or more embodiments, the nitrogen gas and hydrogen gas are comingled and fed together into feed gas inlet 260a of a compressor 260 that compresses the comingled gases into a feed gas stream 262 of hydrogen and nitrogen. Feed gas stream 262 exiting feed gas outlet 260b is then directed to a preheater 264 where the feed gas stream 262 is preheated. Specifically, a preheater inlet 264a is in fluid communication with feed gas outlet 260b of compressor 260. The heated, pressurized feed gas stream 262 exits preheater 264 via feed gas outlet 264b, after which the heated, pressurized feed gas stream 262 is brought into contact with a catalyst assembly 266 disposed within an ammonia production reactor 268. In some embodiments, reactor 268 may be a column formed of an elongated, vertical vessel 270 having a catalyst assembly 266 disposed therein. In one or more embodiments, catalyst assembly 266 may be an iron or iron-based catalyst supported on a catalyst bed as is known in the industry. In one or more embodiments, preheater 264 may be integrally disposed within reactor 268. In any event, reactor 268 includes an inlet 274 in fluid communication with the outlet 264b of preheater 264. In one or more embodiments, the pressure and temperature of the feed gas stream 262 introduced into reactor 268 is at least 400-450 degrees Celsius at approximately 200 atmospheres. Reactor 268 also includes a gaseous ammonia outlet 272 through which a hot ammonia gas stream 273 exits reactor 268. In one or more embodiments, where reactor 268 is an elongated, vertical vessel 270, inlet 274 is disposed in a lower portion 270a of elongated vertical vessel 270, below catalyst assembly 266, and outlet 272 is disposed in an upper portion 270b of elongated, vertical vessel 270, above catalyst assembly 266.

The outlet 272 of reactor 268 is in fluid communication with a liquefaction system 280 which includes at least a condenser 282 for producing liquified ammonia from ammonia gas stream 273. In some embodiments, liquefaction system 280 may also include a heat exchanger assembly 284 having a gaseous ammonia inlet 284a and a gaseous ammonia outlet 284b to treat the hot ammonia gas stream 273 before introduction into condenser 282. In one embodiment, condenser 282 may have a heat exchange mechanism 286 disposed within a condenser vessel 288. A gaseous ammonia inlet 290 of condenser 282 is in fluid communication with the outlet 272 of vessel 270. A cooling fluid inlet 292 of condenser 282 and a cooling fluid outlet 294 of condenser 282 allow a cooling fluid 296 to pass through condenser 282 in order to condense the gaseous ammonia introduced into condenser 282. In one or more embodiments, the cooling fluid 296 is seawater and cooling fluid inlet 292 is in fluid communication with seawater intake 129 (see FIG. 4), while in other embodiments the cooling fluid inlet 292 may be in fluid communication with purified water from water purification unit 140. Finally, condenser 282 includes a liquified ammonia outlet 298 to remove condensed ammonia from condenser 282. In some embodiments, cooling fluid passes through heat exchanger assembly 284, while in other embodiments, the hot ammonia gas stream passes through heat exchanger assembly 284. In any event, liquified ammonia from liquified ammonia outlet 298 may then be collected in a cryogenic storage tank, such as 128 of liquified ammonia floating storage unit 126 shown in FIG. 4. In one or more embodiments, heat exchanger assembly 284 may be utilized to cool the hot ammonia gas stream 273 before introduction into condenser 282, such as is illustrated in FIG. 9. In such case, a cooling fluid such as seawater or purified water from water purification unit 140 may be introduced into heat exchanger assembly 284 and circulate therein utilizing an inlet 287a and an outlet 287b. In other embodiments, heat exchanger assembly 284 may utilize the hot ammonia gas stream 273 from reactor 268 to preheat unreacted gaseous nitrogen and hydrogen recycled from the ammonia gas stream 273 introduced into condenser 282. In such case, unreacted gaseous nitrogen and hydrogen recycled from condenser 282 is circulate through heat exchanger assembly 284 utilizing inlet 287a and outlet 287b.

Figure 10:
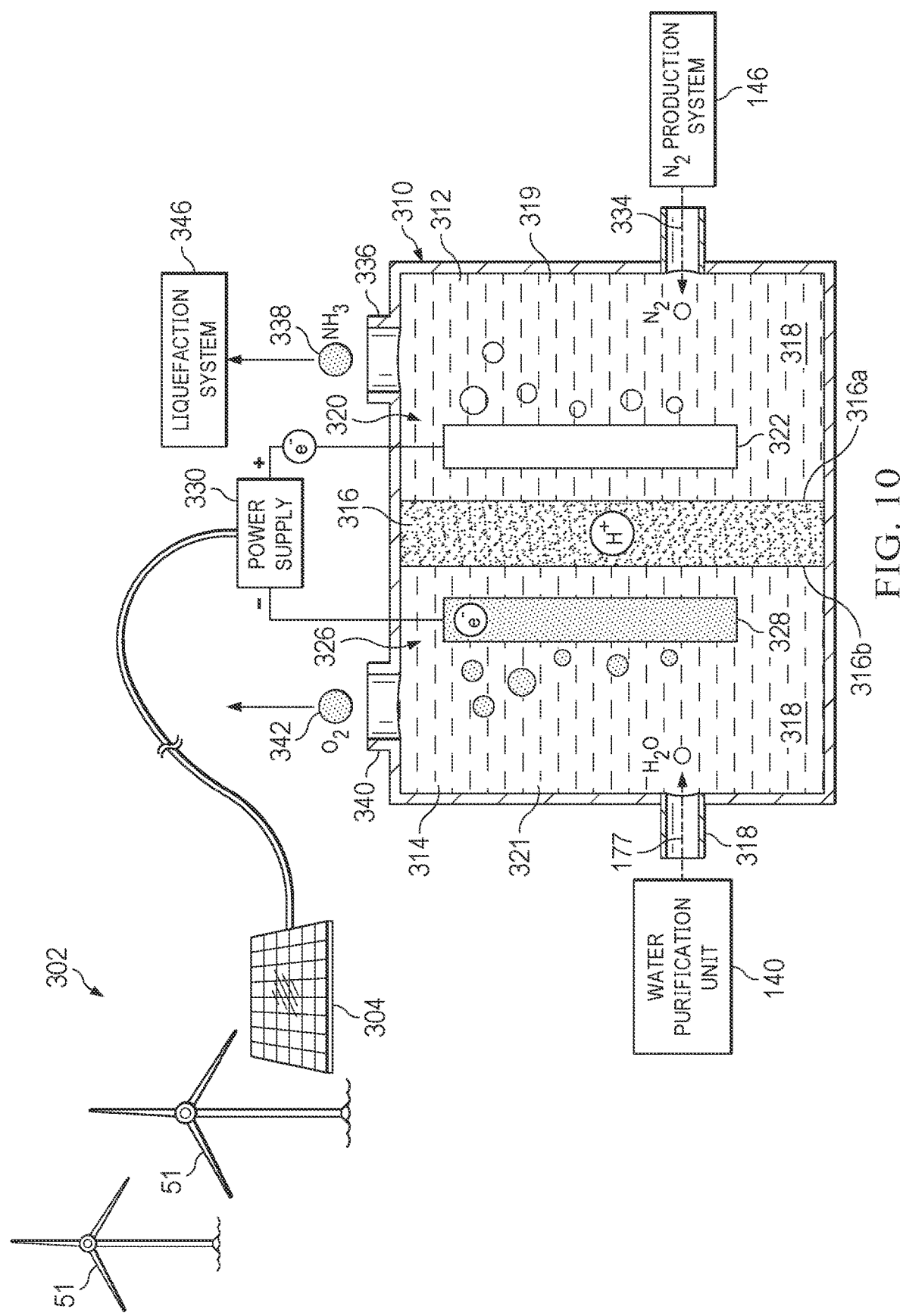
FIG. 10 is another embodiment of an ammonia production system to be used in the offshore marine system of FIG. 4.

FIG. 10 illustrates another embodiment of ammonia production system 136 that takes advantage of the offshore location of marine platform 120. Specifically, ammonia production system 136 is shown as a reverse fuel cell assembly 300 that utilizes electricity provided from an offshore electricity source 302, such as wind turbines 51 or solar cell assemblies 304 positioned in the vicinity of marine platform 120; seawater purified utilizing the water purification unit 140 as described above; and air processed in the nitrogen production system 146 to produce gaseous nitrogen as described above. Reverse fuel cell assembly 300 includes an ammonia production vessel 310 having a first chamber 312 and a second chamber 314 with a membrane 316 disposed between the first and second chambers 312, 314. While not limited to a particular type of membrane, in one or more embodiments, membrane 316 is an ion exchange membrane. However, other membranes may also be utilized. In any event, purified water 177 from water purification unit 140 is delivered to ammonia production vessel 310 via a purified water inlet 318 provided in ammonia production vessel 310. A cathode assembly 320 having a cathode 322 extending into first chamber 312 is provided on a first side 316a of the membrane 316, and an anode assembly 326 having an anode 328 extending into second chamber 314 is provided on a second side 316b of membrane 316. A power supply 330 electrically couples anode assembly 326 and cathode assembly 320. As will be appreciates, purified water 177 is provided in first chamber 312 and second chamber 314. Reverse fuel cell assembly 300 also includes a gaseous nitrogen inlet 334 in fluid communication with nitrogen production system 146 and disposed to introduce gaseous nitrogen into the purified water 177 disposed in first chamber 312.

In some embodiments, first chamber 312 may include a first catalyst 319 and second chamber 314 may include a second catalyst 321. In some embodiments, the first catalyst 319 and the second catalyst 321 are in suspension in their respective chambers 312, 314. In some embodiments, the first catalyst 319 coats the cathode 322 and the second catalyst 321 coats the anode 328. At the anode 328, water molecules are split into oxygen, hydrogen ions, and electrons. The protons flow through the water and membrane 316 to the cathode 322. At the cathode 322, nitrogen is split into molecules and the hydrogen ions and electrons react with nitrogen to produce ammonia.

A gaseous ammonia outlet 336 is provided in first chamber 312 for allowing ammonia 338 to pass therethrough, and an oxygen outlet 340 is provided in second chamber 314 for allowing oxygen 342 to pass therethrough. In one or more embodiments, electricity is provided to power supply 330 from wind turbines 51 (see FIG. 4) or from solar cell assemblies 304 mounted on marine platform 120, while in other embodiments, electricity may be provided to power supply 330 from another source, such as electric generators disposed onboard marine platform 120.

Gaseous ammonia from outlet 336 may be pumped to a liquefaction system 346 to produce liquified ammonia for local storage, such as on liquified ammonia floating storage unit 126.

Figure 11:
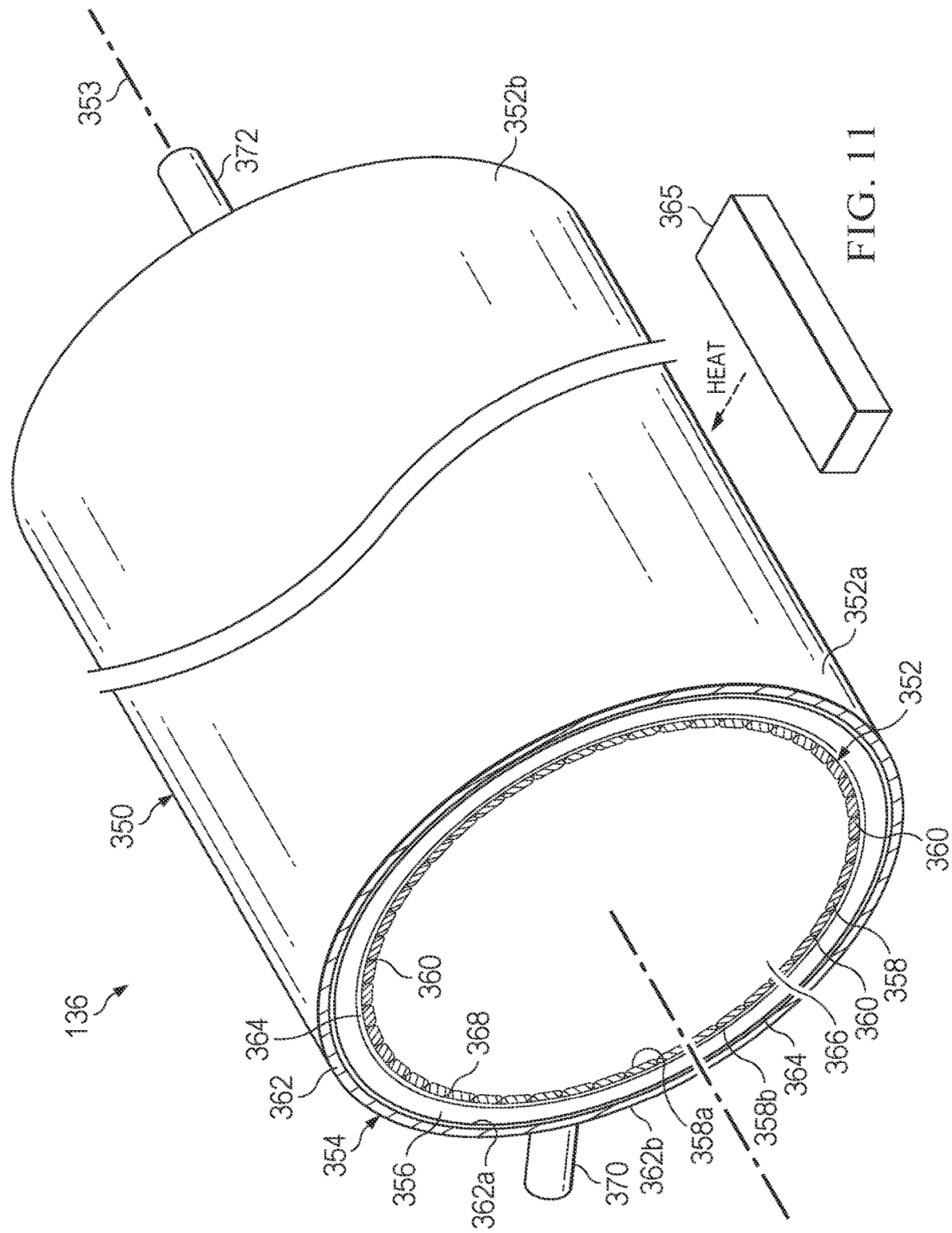
FIG. 11 is another embodiment of an ammonia production system to be used in the offshore marine system of FIG. 4.

FIG. 11 illustrates another embodiment of ammonia production system 136 that takes advantage of the offshore location of marine platform 120. Specifically, ammonia production system 136 is shown as a membrane reactor 350 having an elongated first cylinder 352 extending along an axis 353 and concentrically arranged within an elongated second cylinder 354 extending along axis 353, wherein the first cylinder 352 is spaced apart from the second cylinder 354 to form an annulus 356 therebetween. The first cylinder 352 has a first end 352a and a second end 352b with a cylinder wall 358 extending between ends 352a, 352b. Cylinder wall 358 has an inner surface 358a and an outer surface 358b with a plurality of perforations 360 formed in cylinder wall 258. Likewise, the second cylinder 354 is formed of a cylinder wall 362 having an inner surface 362a and an outer surface 362b. A first catalyst 364 is disposed adjacent the outer surface 358b of the first cylinder 352 to split gaseous hydrogen molecules into hydrogen atoms for reaction with nitrogen. In some embodiments, first catalyst 364 may also be disposed adjacent the inner surface 362a of outer cylinder 354 to enhance hydrogen dissociation. In any event, gaseous hydrogen is pumped into annulus 356 under pressure. The cylinders are subjected to a heat from a heat source 365 to facilitate disassociation of the hydrogen into individual hydrogen atoms. In any event, under pressure, the hydrogen atoms pass through the first catalyst 364 and perforations 360 formed in the inner cylinder 352, passing into the interior 366 of the first cylinder 352.

A second catalyst 368 is disposed adjacent the inner surface 358a of the first cylinder 352. Nitrogen gas is pumped into the interior 366 of first cylinder 352 where the second catalyst 368 and heat from heat source 365 causes nitrogen dissociation, allowing the hydrogen atoms passing into interior 366 to combine with nitrogen atoms forming ammonia. In one or more embodiments, the second catalyst 368 may be palladium. In one or more embodiments, a single first cylinder 352 may be replaced with a plurality of smaller first cylinders 352 (similar to the arrangement of axially extending, elongated tubes 250 described above), each with perforations 360, first catalyst 364 and second catalyst 368 as described above, where hydrogen is introduced axially into the plurality of first cylinder 352.

It will be appreciated that each of first and second cylinder 352, 354, respectively, may be enclosed with end walls such as is depicted as 332a, 332b in FIG. 8. Likewise, a hydrogen inlet 370 may be utilized to introduced pressurized hydrogen gas to the annulus 356, and an inlet similar to air inlet 242 of FIG. 8 may be used to introduced nitrogen into the interior 366 of first cylinder(s) 352. An ammonia outlet 372 may be utilized to remove gaseous ammonia and unreacted nitrogen and hydrogen from interior 366 of first cylinder(s) 352. Ammonia outlet 372 may be axially disposed. In this regard, similar to FIG. 8, the nitrogen inlet and ammonia outlet 372 may be axially arranged on opposing ends 352a, 352b of elongated first cylinder 352 to allow a continuous flow, with nitrogen gas introduced adjacent first end 352a and ammonia gas exiting adjacent second end 352b.

Figure 12:
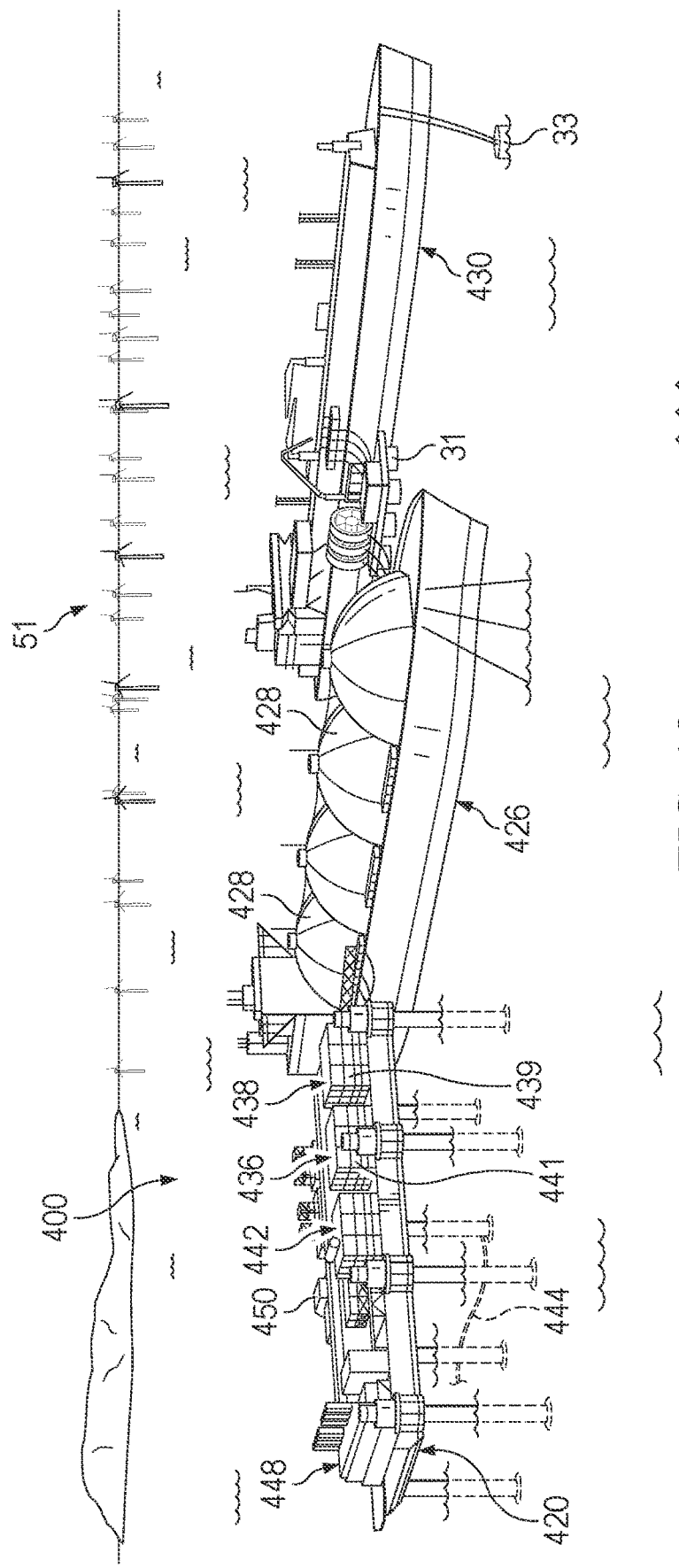
FIG. 12 is an offshore marine system for hydrogen production utilizing liquified methane.

With reference to FIG. 12, a hydrogen fuel production system 400 is shown in which is a marine platform 420 is positioned offshore for receipt of liquified methane from a liquified methane storage unit 426 positioned on or adjacent to marine platform 420. In one or more embodiments, the liquified methane storage unit 426 is a floating storage unit moored adjacent the marine platform 420 and disposed to transfer liquified methane to marine platform 420 for processing into gaseous hydrogen fuel. The floating liquified methane storage unit 426 may include a plurality of bulk storage tanks 428 for receipt of liquified ammonia delivered from a liquified methane transport vessel 430. It will be appreciated that in some embodiments, the total liquified cargo storage capacity of the liquified methane transport vessel 430 is smaller than the total liquified methane storage capacity of the liquified methane storage unit 426 such that liquified methane storage unit 426 can be utilized as a collection or gather point for bulk storage of smaller volumes of liquified methane delivered by liquified methane transport vessel 430. Thus, floating liquified methane storage unit 426 has a first total liquified methane storage volume and liquified methane transport vessel 430 has a second total liquified methane storage volume that is less than the first total liquified methane storage volume.

In one or more embodiments, marine platform 420 may be a jack-up platform, a semi-submersible platform, a barge, a buoyant vessel, a fixed platform, a spar platform, or a tension-leg platform which is fixed to the ocean floor or otherwise moored for long periods of deployment in a single location. In other embodiments, marine platform 420 may be a floating vessel such as a barge or ship that can be moored in place for long term deployment. In other embodiments, marine platform 420 may be a floating vessel such as a barge or ship. Moreover, while marine platform 420 and liquified methane floating storage unit 426 are shown separately, they can be integrally formed either on the marine platform 420 or the liquified methane floating storage unit 426. In either case, marine platform 420 and liquified methane floating storage unit 426 may be relocatable in order to provide on-demand hydrogen to consumers via methane import, such as from liquified methane transport vessel 430 or a liquified methane floating storage unit 426.

Disposed on marine platform 420 is a hydrogen production system 436 which produces hydrogen (H2) from the gaseous methane. Hydrogen production system 436 may also include a pretreatment unit 438 for converting liquified methane to gaseous methane. In one or more embodiments, the pretreatment unit 438 may be an expansion valve wherein cryogenic methane converts to gaseous methane as the methane passes through the expansion valve. In one or more other embodiments, pretreatment unit 438 may be a heat exchanger 439 for heating liquified methane, i.e., cryogenic methane, from liquified methane floating storage unit 426. The heated liquified methane converts into gaseous methane, after which the gaseous methane is introduced into a reactor 441 of hydrogen production system 436 which produces a product gas mixture of hydrogen and other gases from the gaseous methane. Although not necessary, in some embodiments, the product gas mixture may be introduced into a hydrogen purification unit 442, such as is described above, in order to produce purified hydrogen from the product gas mixture.

At this point, the produced hydrogen, either as purified hydrogen or a product gas mixture, may utilized onboard marine platform 420 to generate electricity. Specifically, the produced hydrogen is utilized onboard marine platform 420 for power production. Thus, marine platform 420 includes one or more combustion turbines 448 to produce mechanical power that is converted to electric power by one or more electric generators 450. Nitrogen from the hydrogen purification unit 442 may be released into the atmosphere. Additionally, in one or more embodiments, heat produced from the combustion turbines 448 may be utilized by hydrogen production system 436, as a heat source for heat exchanger 439 and/or reactor 441 or for other heating purposes. Likewise, electricity produced from the electric generators 450 may be utilized by hydrogen production system 436 to operate hydrogen production system 436. Alternatively, or in addition thereto, electricity may be provided to marine platform 420 and hydrogen production system 436 by offshore wind turbines 51 disposed in the vicinity of marine platform 420. In some embodiments, offshore wind turbines 51 may be utilized initially to supply electricity to hydrogen production system 436 until combustion turbines 448 can be brought online to produce mechanical power that is converted to electric power by one or more electric generators 450, after which the electricity for hydrogen production system 436 may be supplied by electric generators 450. In other words, wind turbines 51 may be utilized on startup of hydrogen production system 436 while electric generators 450 may be used for ongoing operations. In any event, electricity produced by electric generators 450 may be transmitted to an onshore or near shore location or terminal via a conveyance system 44, such as the illustrated electrical cable 44.

Figure 13:
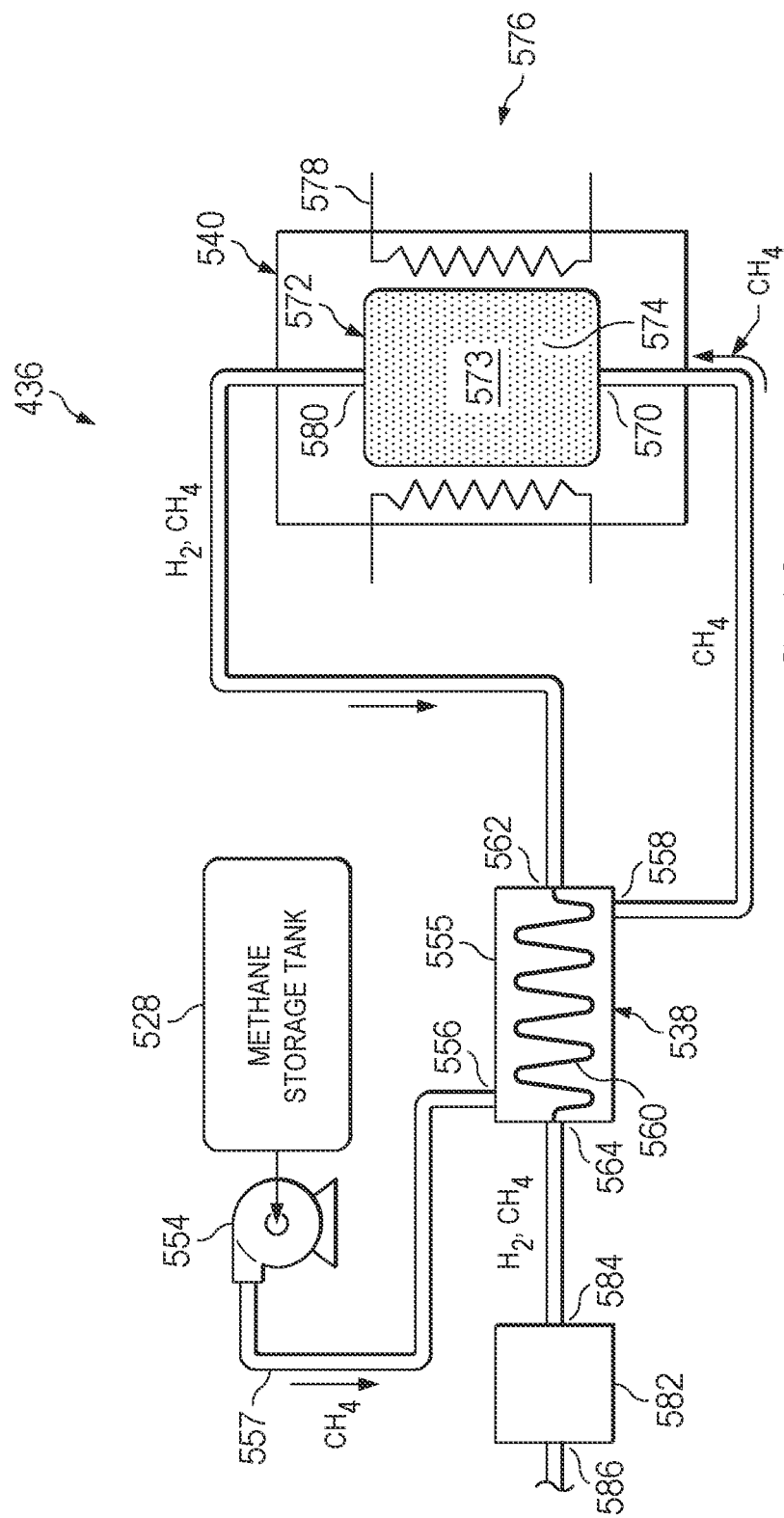
FIG. 13 is one embodiment of a hydrogen production system of FIG. 12 using methane feedgas.

While hydrogen production system 436 may be any system utilized to produce hydrogen from methane, including but not limited to catalytic cracking, thermal cracking, and methane reforming, FIG. 13 illustrates one embodiment of hydrogen production system 436 in more detail by a flow diagram. In FIG. 13, a cryogenic pump 554 is utilized to pump liquified methane along a flowline 557 from a cryogenic storage tank 528, such as may be carried on liquified methane storage unit 526, to a production reactor 540. In one or more embodiments, a pretreatment unit 538 may be disposed along flowline 557. In the illustrated embodiment of FIG. 13, pretreatment unit 538 is shown as heat exchanger 538 that is utilized to convert the liquified methane to gaseous methane. Heat exchanger 538 includes a vessel 555, with a liquified methane inlet 556, and a gaseous methane outlet 558. Although not necessary, as shown, in some embodiments, heated product gas mixture from production reactor 540 may be used to provide heat to heat exchanger 538. In other embodiments heat exchanger 538 may be provided with heat from another source, such as the combustion gases resulting from operation of combustion turbines 548. Moreover, while heat exchanger 538 is shown as separate from production reactor 540, in other embodiments, heat exchanger 538 may be integrally formed as part of production reactor 540. In any event, heat exchanger 538 is not limited to a particular type of heat exchanger. In the illustrated embodiment, vessel 555 includes a heat exchange mechanism 560, such as tubes, plates or the like, with heated product gas comprising produced hydrogen, methane and other carbon containing gases such as carbon monoxide and carbon dioxide are introduced into the heat exchange mechanism 560 at inlet 562 and discharged from heat exchange mechanism 560 at outlet 564.

Gaseous methane from pretreatment unit 538, whether a heat exchanger or expansion valve or other device, is introduced into production reactor 540 via gaseous methane inlet 570. Production reactor 540 includes a reactor vessel 572 where gaseous methane is dissociated in a reaction chamber 573. In some embodiments, a catalyst system 574 may be disposed within reactor vessel 572. It will be appreciated that the type of catalyst system 574 will depend on the particular method of hydrogen production carried out by hydrogen production system 436. For example, in some embodiments, catalyst system 574 may comprise a zeolite catalyst. In some embodiments, catalyst system 574 may comprise a platinum catalyst or a nickel catalyst.

In any event, heat from a heat source 576 is applied to reactor vessel 572 to supply heat to reaction chamber 573. In some embodiments, the heat from heat source 576 may be applied via a heat exchanger 578 disposed adjacent reactor vessel 572. In one or more embodiments, the heat source 576 may be heating coils or elements disposed adjacent reactor vessel 572. In some embodiments, heat source 576 may be steam, such as is used in steam reforming. In some embodiments, heat source 576 may be plasma. It will be understood that the disclosure is not limited to a particular type of hydrogen production reactor, nor individual components thereof described herein.

As is known in the industry, gaseous methane is dissociated within production reactor 540 to yield gaseous hydrogen and other gases, which gaseous mixture exits production reactor 540 via a product gas outlet 580. In one or more embodiments, the product gas mixture exiting production reactor 540 via product gas outlet 580 can then be introduced into a hydrogen purification unit 582 for further processing. Specifically, hydrogen purification unit 582 may include an inlet 584 in fluid communication with the product gas outlet 580 of the production reactor 540. In other embodiments, as illustrated, the gaseous mixture from production reactor 540 may first be utilized in heat exchanger 538 to preheat liquified methane from cryogenic storage tanks 528 before the gaseous mixture is introduced into hydrogen purification unit 582. Although hydrogen purification unit 582 is preferred in some embodiments, it will be appreciated that the disclosure is not limited to use of a hydrogen purification unit. Moreover, the disclosure is not limited to a particular type of hydrogen purification unit. Thus, hydrogen purification unit 582 may include, but is not limited to, a pressure swing adsorption (PSA) system having two or more pressure vessels with at least a nitrogen absorbent in each vessel; a membrane separation system utilizing gaseous mixture flow through a membrane to separate hydrogen from other gases; a electrochemical separation system; and a distillation system.

In any event, purified hydrogen exits hydrogen purification unit 582 through outlet 586. In one or more embodiments, outlet 586 is in fluid communication with one or more combustion turbines 448 mounted on marine platform 420 so that the produced hydrogen can be utilized as fuel in the combustion turbines 448 in order to generate electricity which electricity is then transmitted to remote locations via conveyance system 444, in which case, conveyance system 44 may be an electrical cable. Alternatively, conveyance system may include both a pipeline for conveying a first portion of the hydrogen produced on marine platform 420 and an electrical cable for conveying electricity produced on marine platform 420 using a second portion of the hydrogen produced on marine platform 420.

Figure 14:
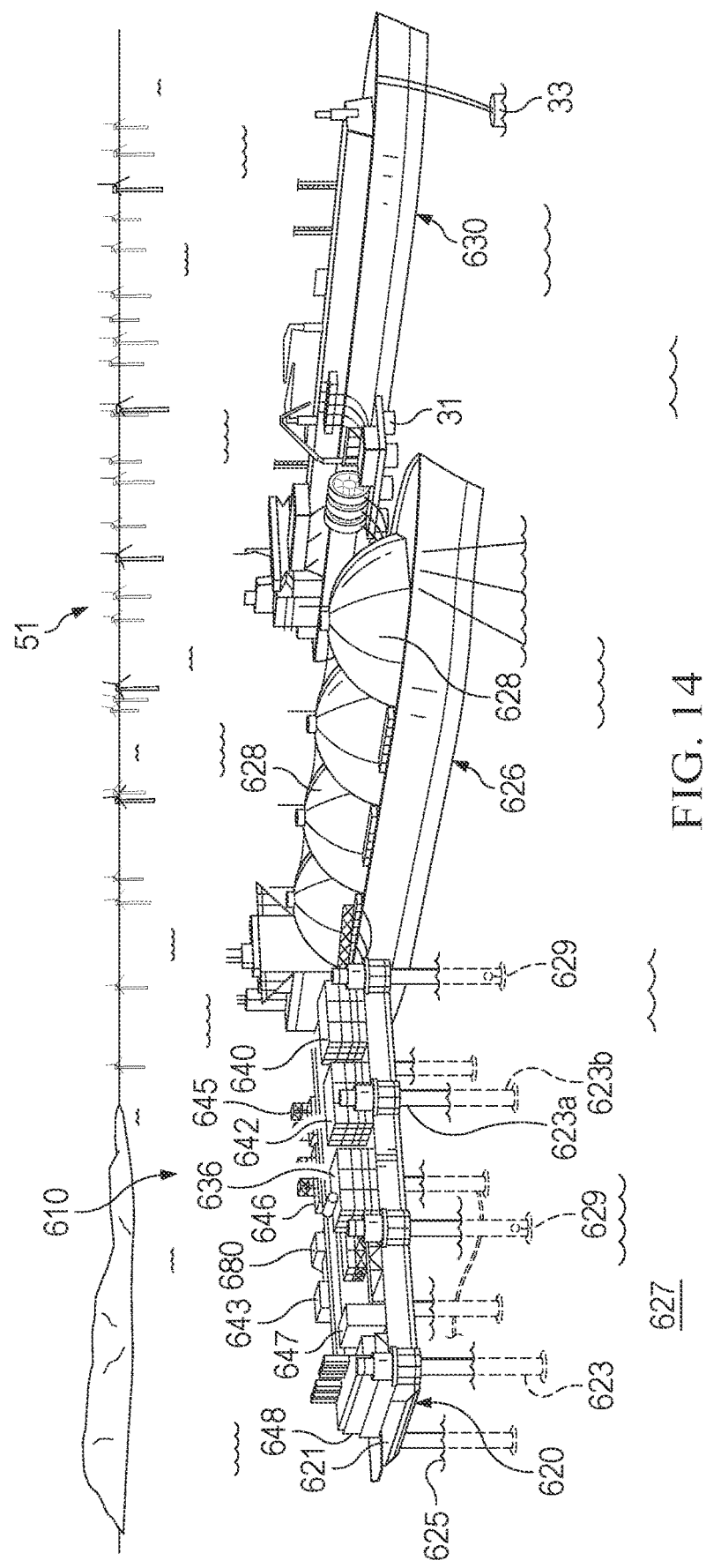
FIG. 14 is an offshore marine system for synthetic methane production.
Figure 15:
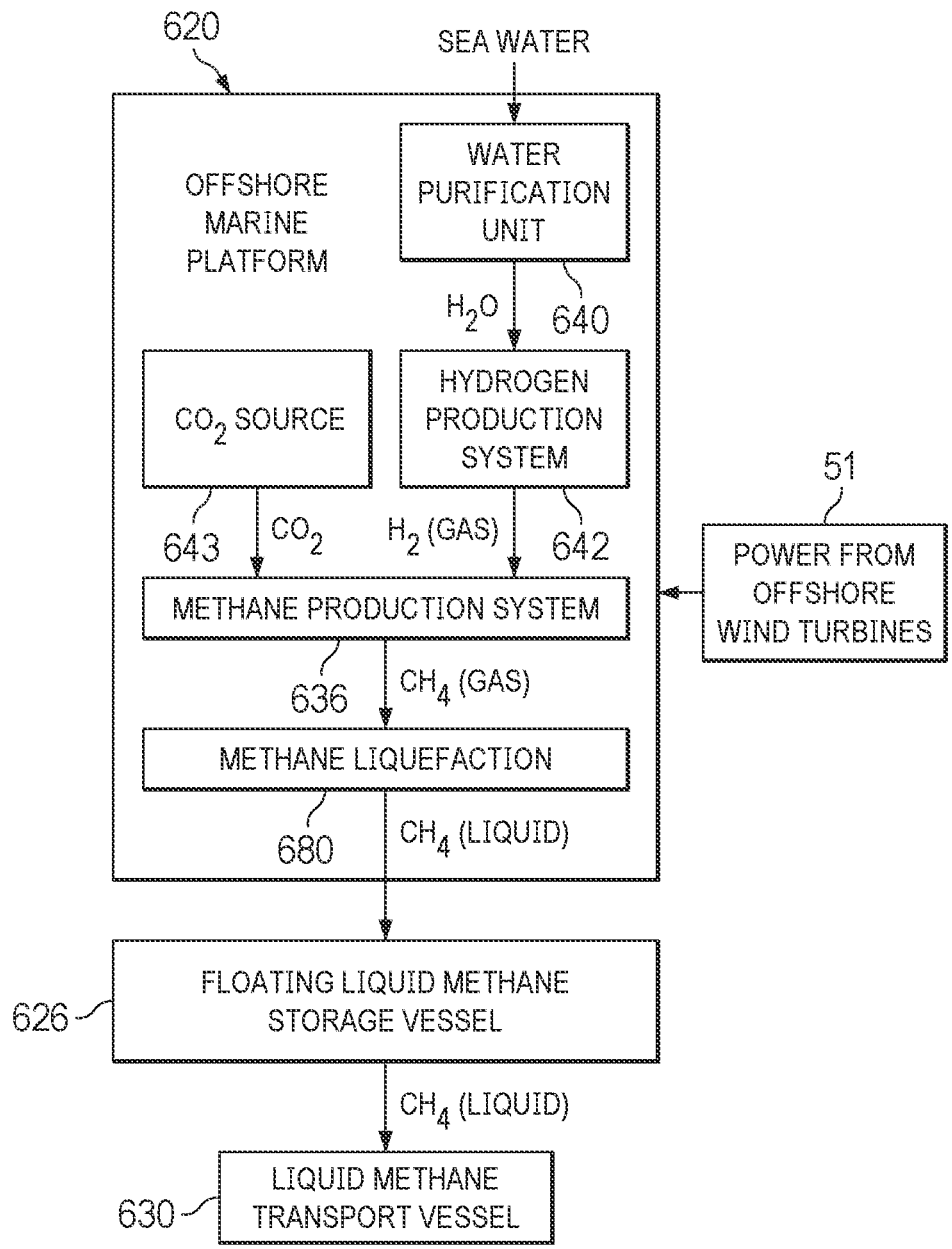
FIG. 15 is a schematic of the offshore marine system of FIG. 14.

With reference to FIGS. 14 and 15, another embodiment of hydrogen fuel production system 610 is shown in which a marine platform 620 is positioned offshore and includes methane production system 636 for the production of methane, which is liquified and bulk stored in a liquified methane storage unit 626 adjacent marine platform 620, thereby capitalizing on the enormous potential of methane as a carrier for renewable hydrogen. In one or more embodiments, liquified methane storage unit 626 is a liquified methane floating storage unit 626 and may include a plurality of bulk storage tanks 628 for receipt of liquified methane produced onboard marine platform 620. In the illustrated embodiment, liquified methane produced at marine platform 620 and stored in bulk by liquified methane floating storage unit 626 can be transferred to a liquified methane transport vessel 630 for transport to other locations. Hydrogen fuel production system 610 therefore includes a first pump to transfer by pumping the produced liquified methane from marine platform 620 to liquified methane floating storage unit 626.

In one or more embodiments, marine platform 620 may be a jack-up platform, a semi-submersible platform, a barge, a buoyant vessel, a fixed platform, a spar platform, or a tension-leg platform which is fixed to the ocean floor or otherwise moored for long periods of deployment in a single location. In other embodiments, marine platform 620 may be a floating vessel such as a barge or ship that can be moored in place for long term deployment. In other embodiments, marine platform 620 may be a floating vessel such as a barge or ship. Moreover, while marine platform 620 and liquified methane floating storage unit 626 are shown separately, they can be integrally formed either on the marine platform 620 or the liquified methane floating storage unit 626. Electricity may be provided to marine platform 620 for the production of methane by one or more offshore wind turbines 51 disposed in the vicinity of marine platform 620.

In one or more embodiments, marine platform 620 includes a deck 621 and three or more platform legs 623, where each leg 623 has a first end 623a and a second end 623b. Deck 621 is disposed adjacent the first end 623a of each platform leg 623 and supported above the seawater surface 625. The second end 623b of each platform leg 623 may engage the seabed 627.

In any event, methane production system 636 utilizes hydrogen (H2) sourced onboard marine platform 620 and a carbon source, such as carbon monoxide (CO) or carbon dioxide (CO2), to produce the liquified methane in a methanation process. It will be appreciated that methane produced using hydrogenation as described herein is often referred to as synthetic methane.

In one or more embodiments, marine platform 620 includes a water purification unit 640, and a hydrogen production system 642, where the hydrogen production system 642 utilizes purified water from the water purification unit 640 to produce hydrogen.

Also positioned on or adjacent marine platform 620 is a carbon source 643 to provide carbon gas to marine platform 620. In one or more embodiments, the carbon source 643 may supply carbon gas in the form of carbon dioxide or carbon monoxide from a carbon source onboard marine platform 620, such as example, exhaust from combustion turbines 648 utilized onboard marine platform 620. In other embodiments, carbon source 643 may be exhaust from other industrial processes utilized onboard marine platform 620, such as boilers (not shown). As used herein, carbon source 643 may include the industrial equipment in which fuel is burned to produce exhaust gas containing carbon gas, as well as the carbon capture system utilized to remove carbon gas from the exhaust gas of the industrial equipment. In other embodiments, carbon source 643 may be a carbon capture system forming a part of combustion turbine 648 and disposed to receive exhaust gas from combustion turbines 648 on the marine platform 620. In other embodiments, carbon source 643 may be a regasification system 645 onboard marine platform 620 for to convert liquified carbon dioxide delivered from an external source, such as a transport vessel similar to transport vessel 630, to gas for use in hydrogen production system 642. In still other embodiments, carbon source 643 may be a direct air capture (DAC) system 647 onboard marine platform 620 to capture carbon dioxide directly from ambient air. As with the seawater and electricity from offshore wind turbines 51 located in the vicinity of marine platform 620, air for the DAC system 647 is acquired or sourced in situ at or adjacent marine platform 620.

In any event, the produced hydrogen is utilized in combination with carbon from a carbon source 643 to produce methane in the methane production system 636.

While not limited to a particular water purification unit, in some embodiments, water purification unit 640 of methane production system 636 is the same as the water purification unit 140 shown in FIG. 6, which utilizes reverse osmosis and includes a water purification vessel 152 having a first chamber 154 and a second chamber 156 with a semi-permeable membrane 168 disposed between the first and second chambers 154, 156. A seawater inlet 160 is provided in the first chamber 154 and a purified water outlet 162 is provided in the second chamber 156. Water purification unit 140 also includes a pump 164 for pressurizing the seawater in the first chamber 154. Pump 164 is in fluid communication with a seawater intake 629 shown in FIG. 13 to draw in seawater for purification.

With reference back to FIG. 14, in one or more embodiments, seawater intake 629 is disposed adjacent the second end 623b of a platform leg 623 of marine platform 620 to draw in cooler water from the adjacent body of seawater, while in other embodiments, seawater intake 629 is disposed between the first and second leg ends 623a, 623b, respectively, of a platform leg 623, adjacent the seawater surface 625, to draw in warmer water from the adjacent body of seawater.

While semi-permeable membrane 168 of FIG. 6 may be any membrane known for use in reverse osmosis, in one or more embodiments, semi-permeable membrane 168 may be a thin polyamide layer (<200 nm) deposited on top of a polysulfone porous layer (about 60 microns) on top of a non-woven fabric support sheet and having a pore size of approximately 0.0001 micron. Seawater drawn in and pumped to the water purification unit 140 where the water purification unit 140 is utilized to at least partially purifying the pumped seawater to yield purified water, after which, the hydrogen production system 642 of FIG. 14 is used to generate gaseous hydrogen from the purified water. In one or more embodiments, a purified water storage vessel 166 is fluidically disposed between the purified water outlet 162 of the water purification unit 140 and the hydrogen production system 642.

With ongoing reference to FIG. 14 and reference back to FIG. 6, while not limited to a particular hydrogen production system, in some embodiments, hydrogen production system 642 onboard marine platform 620 utilizes electrolysis to produce hydrogen. Thus, hydrogen production system 642 of FIG. 14 may be the same as hydrogen production system 142 described in FIG. 6 where a hydrogen production vessel 170 is provided, having a first chamber 172 and a second chamber 174 with a membrane 176 disposed between the first and second chambers 172, 174. While not limited to a particular type of membrane, in one or more embodiments, membrane 176 is a proton exchange membrane (PEM) or alkaline membrane. However, other membranes may also be utilized. In any event, purified water 177 from water purification unit 140 or 640 as the case may be is delivered to hydrogen production vessel 170 via a purified water inlet 178 provided in hydrogen production vessel 170. An anode assembly 180 having an anode 182 extending into first chamber 172 is provided on a first side 176a of the membrane 176, and a cathode assembly 184 having a cathode 186 extending into second chamber 174 is provided on a second side 176b of membrane 176. A power supply 188 electrically couples anode assembly 180 and cathode assembly 184. As will be appreciates, purified water 177 may be provided in either first chamber 172, second chamber 174 or both, depending on the hydrogen production system 142. Relatedly, a purified water inlet 178 may likewise be provided in either first chamber 172, second chamber 174 or both. In any event, an oxygen outlet 190 is provided in first chamber 172 for allowing oxygen 192 to pass therethrough, and a hydrogen outlet 194 is provided in second chamber 174 for allowing hydrogen 196 to pass therethrough. In one or more embodiments, electricity is provided to power supply 188 from wind turbines 61, while in other embodiments, electricity may be provided to power supply 188 from another source, such as electric generators disposed onboard marine platform 620.

Methane production system 636 onboard marine platform 620 is not limited to a particular configuration. In some embodiments, methane production system 636 may include a methane production reactor or column in which a catalyst system is provided to interact with gaseous hydrogen and gaseous carbon gas pumped therethrough from hydrogen production system 642 in order to produce gaseous methane.

Figure 16:
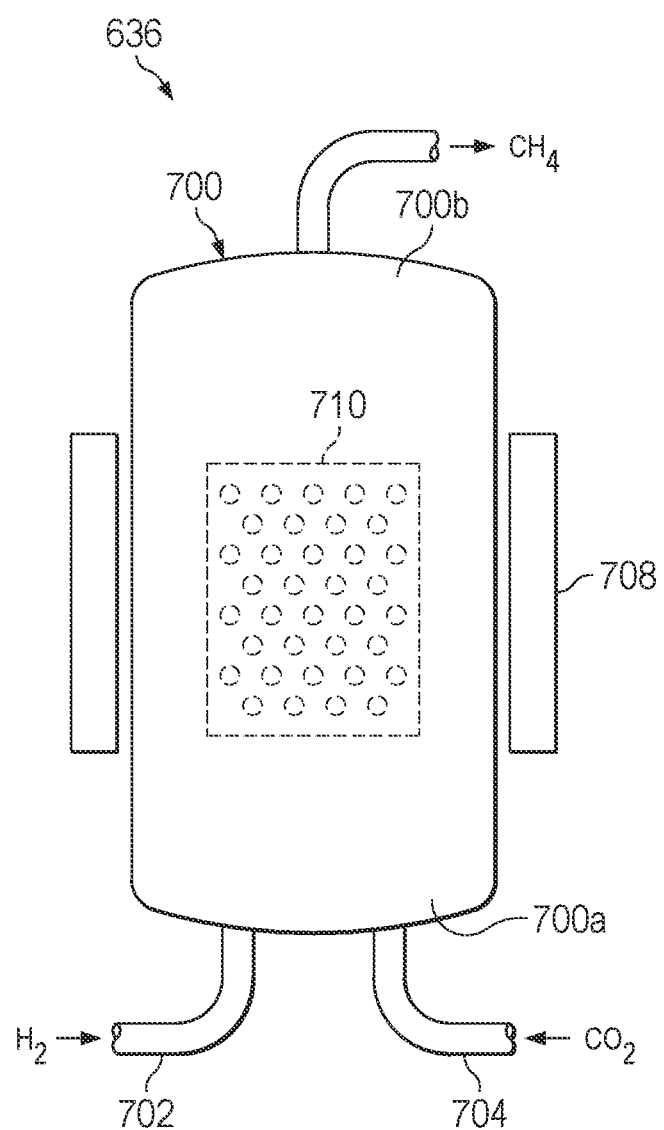
FIG. 16 is one embodiment of a methane production system used on the offshore marine system of FIG. 14.

More specifically, in one embodiment illustrated in FIG. 16, methane production system 636 includes a methanation vessel 700 having a gaseous hydrogen inlet 702, a carbon dioxide inlet 704 and a gaseous methane outlet 706. In some embodiments, the methanation vessel 700 is an elongated, vertical vessel having a first lower end 700a and a second upper end 700b, wherein the gaseous hydrogen inlet 702 and the carbon dioxide inlet 704 are adjacent the first lower end 700a and the gaseous methane outlet 706 is adjacent the second upper end 700b. A heat source 708 may be thermally coupled to the vessel 700 in order to provide heat for the methanation reaction. In one or more embodiments, the heat source may be one or more combustion turbines 648 on marine platform 620. Disposed within vessel 700 is a catalyst system 710. In one or more embodiments, catalyst system 710 is a metal-based catalyst suspended in a liquified disposed within the methanation vessel. In one or more embodiments, the metal-based catalyst is nickel. In any event, hydrogen and carbon dioxide react within vessel 700 to produce gaseous methane.

Thereafter, the gaseous methane produced onboard marine platform 620 is liquified by methane liquefaction system 646 onboard marine platform 620. The disclosure is not limited to a particular methane liquefaction system 646, but may include any methane liquefaction system known in the art. Liquified methane, i.e., cryogenic methane, from methane liquefaction system 646 is then stored on liquified methane floating storage unit 626 for collection until loaded on one or more liquified methane transport vessels 630.

The plurality of offshore wind turbines 51 may provide electricity to marine platform 620 to provide power to one or more of the carbon source 643, the hydrogen production system 642, the water purification unit 640 and the methane production system 636.

Thus, a system for offshore production of fuel has been described. The system may include an offshore marine platform; at least one ammonia cracking system on the marine platform disposed to produce hydrogen from ammonia; a liquified ammonia floating storage unit moored adjacent the marine platform and in fluid communication with the ammonia cracking system; and a seabed conveyance system extending from the offshore marine platform. In other embodiments, the system may include an offshore marine platform; at least one ammonia cracking reactor on the marine platform, the ammonia cracking reactor comprising a dissociation vessel having a reaction chamber with a catalyst bed disposed therein, a gaseous ammonia inlet, a product gas outlet, and a heat source disposed to provide heat to the reaction chamber; a regassification unit on the marine platform, with a liquified ammonia inlet and a gaseous ammonia outlet, wherein the gaseous ammonia outlet is in fluid communication with the gaseous ammonia inlet of the dissociation vessel; a liquified ammonia floating storage unit moored adjacent the marine platform and in fluid communication with the liquified ammonia inlet of the regassification unit; a cryogenic pump disposed to pump liquified ammonia from the liquified ammonia floating storage unit to the regassification unit; one or more combustion turbines on the marine platform and disposed to combust hydrogen from the ammonia cracking reactor; one or more electric generators driven by the one or more combustion turbines; and a seabed conveyance system extending away from the marine platform, wherein the combustion turbines are the heat source for the at least one ammonia cracking reactor. In other embodiments, the system may include an offshore marine platform; at least one ammonia production system on the marine platform; and a liquified ammonia floating storage unit moored adjacent the marine platform and in fluid communication with the ammonia production system. In other embodiments, the system may include an offshore marine platform; a first pump to transfer by pumping the produced liquified ammonia from marine platform to floating storage unit; a water purification unit on the marine platform, the water purification unit having a purified water outlet and a seawater inlet, the seawater inlet in fluid communication with one or more seawater intakes to draw in seawater for purification; a hydrogen production unit on the marine platform, the hydrogen production unit having a hydrogen gas outlet and a purified water inlet, the purified water inlet in fluid communication with the purified water outlet of the water purification unit; a nitrogen production system on the marine platform, the nitrogen production system having a nitrogen gas outlet; an ammonia production system on the marine platform, the ammonia production system having a hydrogen gas inlet in fluid communication with the hydrogen gas outlet of the hydrogen production unit, a nitrogen gas inlet in fluid communication with the nitrogen gas outlet of the nitrogen production unit, and an ammonia gas outlet; a liquefaction system in fluid communication with the ammonia gas outlet of the ammonia production unit, the liquefaction system having a liquified ammonia outlet; a plurality of offshore wind turbines disposed to provide electricity to at least one of the hydrogen production unit, the nitrogen production system or the ammonia production system; and a liquified ammonia floating storage unit moored adjacent the marine platform and in fluid communication with the liquified ammonia outlet of the liquefaction system. In other embodiments, the system may include an offshore marine platform; at least one methane cracking system disposed on the marine platform; a liquified methane floating storage unit moored adjacent the marine platform and in fluid communication with the methane cracking system; a pump to pump liquified methane from the liquified methane storage vessel to the offshore marine platform; and a hydrogen gas conveyance system extending from the offshore marine platform. In other embodiments, the system may include an offshore marine platform; at least one methane cracking reactor on the marine platform, the methane cracking reactor comprising a dissociation vessel having a reaction chamber therein, a gaseous methane inlet, a product gas outlet, and a heat source disposed to provide heat to the reaction chamber; a regassification unit on the marine platform, with a liquified methane inlet and a gaseous methane outlet, wherein the gaseous methane outlet is in fluid communication with the gaseous methane inlet of the dissociation vessel; a liquified methane floating storage unit moored adjacent the marine platform and in fluid communication with the liquified methane inlet of the regassification unit; a cryogenic pump disposed to pump liquified methane from the liquified methane floating storage unit to the regassification unit; one or more combustion turbines on the marine platform and disposed to combust hydrogen from the methane cracking reactor; one or more electric generators driven by the one or more combustion turbines; and a seabed conveyance system extending away from the marine platform, wherein the combustion turbines are the heat source for the at least one methane cracking reactor. In other embodiments, the system may include an offshore marine platform; at least one methane production system on the marine platform; at least one hydrogen source on the marine platform and in fluid communication with the methane production system; at least one carbon dioxide source on the marine platform and in fluid communication with the methane production system; and a liquified methane floating storage vessel moored adjacent the marine platform and in fluid communication with the at least one methane production system. In other embodiments, the system may include an offshore marine platform; a water purification unit on the marine platform, the water purification unit having a purified water outlet and a seawater inlet, the seawater inlet in fluid communication with one or more seawater intakes adjacent the marine platform to draw in seawater for purification; a hydrogen production unit on the marine platform, the hydrogen production unit having a hydrogen gas outlet and a purified water inlet, the purified water inlet in fluid communication with the purified water outlet of the water purification unit; a carbon source on the marine platform and disposed to provide carbon gas; a methane production system on the marine platform, the methane production system having a methanation vessel with a gaseous hydrogen inlet in fluid communication with the hydrogen production unit, a carbon gas inlet in fluid communication with the carbon source, and a gaseous methane outlet; a catalyst disposed in the methanation vessel; and a heat source thermally coupled to the methane vessel; a liquefaction system in fluid communication with the gaseous methane outlet of the methane production system, the liquefaction system having a liquified methane outlet; a plurality of offshore wind turbines disposed to provide electricity to at least one of the hydrogen production unit, the carbon source or the methane production system; a liquified methane floating storage unit moored adjacent the marine platform and in fluid communication with the liquified methane outlet of the liquefaction system.

Any of the foregoing offshore production of fuel systems may further include, alone or in combination, any of the following:

A hydrogen purification unit disposed on the marine platform and in fluid communication with the ammonia cracking system.

The ammonia cracking system comprises a pretreatment unit 38 for converting liquified ammonia to gaseous ammonia; and a catalytic cracking reactor which produces a product gas mixture of at least hydrogen and nitrogen from the gaseous ammonia.

The catalytic cracking reactor comprises a gaseous ammonia inlet; a reactor vessel having a reaction chamber; a catalyst bed comprising nickel and disposed in the reaction chamber; a heat source disposed to provide heat to the reaction chamber; and a product gas outlet.

The ammonia cracking system further comprises a pretreatment unit in fluid communication with the liquified ammonia floating storage unit.

A plurality of offshore wind turbines disposed in the vicinity of marine platform and electrically coupled to the ammonia cracking system.

The conveyance system comprises a gas pipeline in fluid communication with one of a hydrogen purification unit, an ammonia cracking system or a blending unit on board the marine platform.

The conveyance system comprises both a gas pipeline and an electrical cable.

A hydrogen purification unit comprises a pressure swing adsorption (PSA) system.

A first pump to transfer by pumping the produced liquified ammonia from marine platform to floating storage unit.

A liquified ammonia transport vessel.

The marine platform comprises a platform deck and three or more platform legs supporting the platform deck, with at least one seawater intakes disposed along at least one leg and in fluid communication with the water purification unit.

The marine platform is a jack-up platform affixed to an ocean floor.

A plurality of offshore wind turbines disposed in the vicinity of marine platform.

A water purification unit on the marine platform, the water purification unit having a water purification vessel with a first chamber and a second chamber, with a semipermeable membrane disposed between the first and second chambers; a seawater inlet in the first chamber; a purified water outlet in the second chamber; a pump for pressurizing the seawater in the first chamber, where the pump is in fluid communication with one or more seawater intakes to draw in seawater for purification.

The marine platform comprises a platform deck and three or more platform legs supporting the platform deck, with at least one seawater intake disposed along at least one leg at first distance from an end of the leg and at least one seawater intake disposed along at least one leg at a second distance from an end of the leg, where the second distance is greater than the first distance.

A nitrogen production system on the marine platform, the nitrogen production system having a nitrogen gas outlet.

The nitrogen production system comprising a pressure swing adsorption (PSA) nitrogen production system.

The nitrogen production system comprising a membrane nitrogen production system.

The nitrogen production system comprises a nitrogen production reaction vessel formed of an elongated cylinder extending along a primary axis, the elongated cylinder having a first end and a second end with a cylinder wall extending between the first end and the second end; a first end wall enclosing the first end of elongated cylinder and a second end wall enclosing the second end of elongated cylinder; the nitrogen gas outlet at the second end of cylinder; a compressed air inlet at the first end of cylinder and in fluid communication with at least one air compressor; and a byproduct outlet; a polymer fiber membrane is disposed in the reaction vessel between the compressed air inlet and the byproduct outlet.

The cylinder wall defines an interior of elongated cylinder, wherein the compressed air inlet is disposed axially at the first end of the cylinder and the nitrogen gas outlet is disposed axially at the second end of the cylinder and the byproduct outlet is disposed in the cylinder wall radially outward from the primary axis; wherein the polymer fiber membrane is disposed about the interior surface of the cylinder wall The ammonia production system comprises a nitrogen inlet in fluid communication with the nitrogen gas outlet of the nitrogen production system; a hydrogen inlet in fluid communication with the hydrogen gas outlet of the hydrogen production unit; one or more compressors having a feed gas inlet in fluid communication with the nitrogen inlet and the hydrogen inlet, and a compressed feed gas outlet; a preheater having a preheater inlet in fluid communication with feed gas outlet of compressor, and a feed gas outlet; an ammonia production reactor in fluid communication with the feed gas outlet of the preheater; a catalyst assembly disposed within the ammonia production reactor; the ammonia production reactor including a gaseous ammonia outlet through which a hot ammonia gas stream exits the ammonia production reactor; a liquefaction system in fluid communication with the gaseous ammonia outlet, the liquefaction system having a liquid ammonia outlet in fluid communication with the liquified ammonia floating storage unit.

The liquefaction system comprises a condenser for producing liquified ammonia from ammonia gas stream; and a heat exchanger assembly having a gaseous ammonia inlet in fluid communication with the gaseous ammonia outlet of the ammonia production reactor and a gaseous ammonia outlet in fluid communication with the condenser.

The catalyst assembly comprises an iron-based catalyst.

The ammonia production system comprises an ammonia production vessel having a first chamber and a second chamber with a membrane disposed between the first and second chambers; a purified water inlet provided in ammonia production vessel and in fluid communication with the water purification unit; a cathode assembly having a cathode extending into first chamber on a first side of the membrane; an anode assembly having an anode extending into second chamber on a second side of membrane; a power supply electrically coupling the anode assembly and cathode assembly; a gaseous nitrogen inlet in fluid communication with nitrogen production system and disposed to introduce gaseous nitrogen into the purified water disposed in first chamber; a gaseous ammonia outlet in the first chamber for allowing ammonia to pass therethrough; and a liquefaction system in fluid communication with the gaseous ammonia outlet, the liquefaction system having a liquid ammonia outlet in fluid communication with the liquified ammonia floating storage unit.

The power supply is electrically coupled to one or more of a plurality of wind turbines.

The ammonia production system comprises a membrane reactor having an elongated first cylinder extending along an axis and concentrically arranged within an elongated second cylinder extending along axis, wherein the first cylinder is spaced apart from the second cylinder to form an annulus therebetween, the first cylinder defining an interior therein; the first cylinder has a first end and a second end with a cylinder wall extending between ends; the cylinder wall has an inner surface and an outer surface with a plurality of perforations formed in cylinder wall; the second cylinder is formed of a cylinder wall having an inner surface and an outer surface; a first catalyst disposed adjacent the outer surface of the first cylinder; a heat source disposed to provide heat to the first and second cylinders; a second catalyst disposed adjacent the inner surface of the first cylinder; a nitrogen gas inlet in fluid communication with the interior of first cylinder; a hydrogen inlet in fluid communication with the annulus; and an ammonia gas outlet in fluid communication with the interior of the first cylinder.

The second catalyst is palladium.

The first cylinder comprises a plurality of first cylinders.

The nitrogen inlet is at a first end of the first cylinder and the ammonia outlet is at a second end of the first cylinder.

A hydrogen purification unit disposed on the marine platform and in fluid communication with the methane cracking system.

The methane cracking system comprises a pretreatment unit for converting liquified methane to gaseous methane; and a cracking reactor which produces a product gas mixture of at least hydrogen from the gaseous methane.

The methane cracking system comprises a cracking reactor having a dissociation vessel with a reaction chamber, a gaseous methane inlet, and a product gas outlet, a heat source operationally connected to the reactor to supply heat to the reaction chamber.

The methane cracking system is a catalytic cracking system that further comprises a A liquified natural gas floating storage unit moored adjacent the marine platform; a first regasification system on the marine platform and in fluid communication with the liquified natural gas floating storage unit; a blending unit on the marine platform and in fluid communication with the first regasification system.

One or more combustion turbines disposed to combust hydrogen-based fuel produced on the marine platform.

One or more electric generators driven by the combustion turbines.

The conveyance system comprises a gas pipeline in fluid communication with one of a hydrogen purification unit, the methane cracking system or a blending unit on board the marine platform.

The conveyance system comprises an electrical cable electrically coupled to one or more electric generators on board the marine platform.

A liquified natural gas floating storage unit moored adjacent the marine platform; an LNG regasification system on the marine platform and in fluid communication with the liquified natural gas floating storage unit; a blending unit on the marine platform and in fluid communication with each of the LNG regasification system and the methane cracking reactor, wherein the blending unit is also in fluid communication with the one or more combustion turbines to provide LNG blended with hydrogen from the methane cracking reactor.

A plurality of offshore wind turbines disposed in the vicinity of marine platform and electrically coupled to the methane cracking reactor.

The carbon source is a carbon capture system disposed to receive exhaust from one or more combustion turbines on the marine platform.

A hydrogen production unit on the marine platform, the hydrogen production unit having a hydrogen production vessel having a first chamber and a second chamber with a membrane disposed between the first and second chambers; an anode assembly having an anode extending into first chamber provided on a first side of the membrane; a cathode assembly having a cathode extending into second chamber on a second side of membrane; a power supply electrically coupled to the anode assembly and cathode assembly; an oxygen outlet in first chamber; and a hydrogen gas outlet in second chamber; and a power supply electrically couples anode assembly and cathode assembly.

One or more combustion turbines on the marine platform and disposed to combust hydrogen from the hydrogen source.

One or more combustion turbines are thermally coupled to the methane production system and wherein the one or more combustion turbines are the carbon source.

A first pump to transfer by pumping the produced liquified methane from the marine platform to the floating storage unit.

The carbon source is a direct air capture (DAC) system.

The carbon source is one or more combustion turbines on the marine platform.

A water purification unit on the marine platform, the water purification unit having a water purification vessel with a first chamber and a second chamber, with a semipermeable membrane disposed between the first and second chambers; and a pump for pressurizing the seawater in the first chamber, wherein the pump is in fluid communication with the one or more seawater intakes; wherein the seawater inlet is disposed in the first chamber; wherein the purified water outlet is disposed in the second chamber.

A hydrogen production unit on the marine platform, the hydrogen production unit having a hydrogen production vessel having a first chamber and a second chamber with a membrane disposed between the first and second chambers; an anode assembly having an anode extending into first chamber provided on a first side of the membrane; a cathode assembly having a cathode extending into second chamber on a second side of membrane; and a power supply electrically coupled to the anode assembly and cathode assembly; wherein the purified water inlet is disposed in the hydrogen production vessel and the hydrogen gas outlet is in the second chamber.

One or more wind turbines disposed in the vicinity of the marine platform, wherein the power supply is electrically coupled the one or more wind turbines.

Likewise, a method for offshore production of fuel has been described. The method may include mooring a liquified ammonia storage vessel adjacent an offshore marine platform; transferring liquified ammonia from the liquified ammonia storage vessel to the offshore marine platform; converting the liquified ammonia to gaseous ammonia; cracking the gaseous ammonia on the offshore marine platform to produce hydrogen gas; and utilizing the hydrogen to produce electricity. In other embodiments, the method may include pumping seawater to a water purification system mounted on an offshore marine platform affixed to the seabed; utilizing the water purification system to at least partially purifying the pumped seawater to yield purified water; pumping air to a nitrogen production system mounted on an offshore marine platform; utilizing the nitrogen production system to produce gaseous nitrogen from the pumped air; utilizing a hydrogen production system mounted on the offshore marine platform to generate gaseous hydrogen from the purified water; and utilizing an ammonia production system mounted on the offshore marine platform to produce gaseous ammonia from the gaseous nitrogen and gaseous hydrogen. In other embodiments, the method may include pumping seawater to a water purification system on an offshore marine platform; utilizing the water purification system to at least partially purifying the pumped seawater to yield purified water; utilizing a hydrogen production system mounted on the offshore marine platform to generate gaseous hydrogen from the purified water; producing carbon gas from a carbon source on the platform; and utilizing a methane production system on the offshore marine platform to produce gaseous methane from the carbon gas and gaseous hydrogen.

Any of the foregoing embodiments of a method may include, alone or in combination, any of the following:

Utilizing a seabed conveyance system to transfer at least a portion of the gaseous hydrogen away from the marine platform The step of utilizing comprises delivering liquified natural gas to the marine platform, the delivered natural gas having a first hydrogen content; gasifying the delivered natural gas to produce gaseous natural gas; and blending the gaseous natural gas with at least a portion of the gaseous hydrogen produced on the marine platform to produce a blended fuel comprising natural gas with a second hydrogen content greater than the first hydrogen content.

Utilizing a portion of the blended fuel in combustion turbines in order to produce electricity onboard the marine platform.

Combusting a portion of the gaseous natural gas having a second concentration of hydrogen in combustion turbines in order to produce electricity onboard the marine platform; and conveying the produced electricity away from the marine platform.

Delivering liquified natural gas to the marine platform, the delivered liquified natural gas having a first concentration of hydrogen; storing the delivered liquified natural gas in a first floating storage unit adjacent the marine platform; pumping liquified hydrogen from a liquified hydrogen floating storage unit moored adjacent the marine platform to the marine platform; gasifying the delivered natural gas pumped to the marine platform to produce gaseous natural gas having a first concentration of hydrogen; blending the gaseous natural gas having a first concentration of hydrogen with at least a portion of the gaseous hydrogen to produce a gaseous natural gas having a second concentration of hydrogen; and combusting a portion of the gaseous natural gas having a second concentration of hydrogen in combustion turbines in order to produce electricity onboard the marine platform.

Utilizing comprises combusting a portion of the hydrogen in combustion turbines in order to produce electricity onboard the marine platform.

Conveying the produced electricity away from the marine platform to an electrical distribution system.

Operating at least one of the nitrogen production system, the hydrogen production system and the ammonia production system utilizing electricity from one or more offshore wind turbines.

Utilizing a liquefaction system on the marine platform to convert the gaseous ammonia to liquified ammonia; and thereafter pumping the liquified ammonia to a liquified ammonia floating storage unit moored adjacent the marine platform.

Gathering a sufficient quantity of liquified ammonia on the liquified ammonia floating storage unit and thereafter, pumping the liquified ammonia from the liquified ammonia floating storage unit to a liquified ammonia transport vessel, wherein the sufficient quantity of liquified ammonia gathered on the floating storage unit is greater than the total storage capacity of the liquified ammonia transport vessel.

Gathering a sufficient quantity of liquified gas on the liquified gas floating storage unit and thereafter, pumping the liquified gas from the liquified gas floating storage unit to a liquified gas transport vessel, wherein the sufficient quantity of liquified gas gathered on the floating storage unit is greater than the total storage capacity of the liquified gas transport vessel.

Utilizing a liquefaction system on the marine platform to convert the gaseous methane to liquified ammonia.

Pumping the liquified methane to a liquified methane floating storage unit moored adjacent the marine platform.

Gathering a sufficient quantity of liquified methane on the to a liquified methane floating storage unit and thereafter, pumping the liquified methane from the liquified methane floating storage unit to a liquified methane transport vessel, wherein the quantity of liquified methane gathered on the floating storage unit is greater than the total storage capacity of the liquified methane transport vessel.

Operating at least one of the methane production system, the hydrogen production system and the carbon source utilizing electricity from one or more offshore wind turbines.

Producing carbon gas comprises operating one or more combustion turbines on the marine platform to produce exhaust gas and capturing carbon gas from the combustion turbine exhaust gas.

Producing carbon gas comprises operating a carbon capture system on the marine platform.

Producing carbon gas comprises removing carbon gas directly from air captured from adjacent the marine platform.

Operating one or more combustion turbines on the marine platform to produce exhaust gas and heat, wherein the exhaust gas is used to provide carbon gas and the heat is used by the methane production system to produce gaseous methane.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

What is claimed:

1. A system for offshore marine production of fuel comprising:
a fixed marine platform attached to a seabed;
at least one ammonia cracking system on the fixed marine platform disposed to produce hydrogen from ammonia, wherein the ammonia cracking system comprises a cracking reactor with a product gas outlet;
a liquified ammonia floating storage unit moored adjacent the fixed marine platform and in fluid communication with the ammonia cracking system;
one or more combustion turbines on the marine platform and disposed to combust hydrogen fuel produced on the marine platform, wherein the one or more combustion turbines are in thermal communication with the at least one ammonia cracking system;
a hydrogen purification unit disposed on the marine platform and in fluid communication with the ammonia cracking system, the hydrogen purification unit having a purified hydrogen outlet in fluid communication with the one or more combustion turbines providing hydrogen as fuel to the one or more combustion turbines; and
a seabed conveyance system extending from the fixed marine platform.

2. The system of claim 1, further comprising:
a source of natural gas in fluid communication with the marine platform;
a blending unit on the marine platform and in fluid communication with the source of natural gas and the ammonia cracking system.

3. The system of claim 2, wherein the source of natural gas comprises
a liquified natural gas floating storage unit moored adjacent the marine platform; and
a liquified natural gas regasification system on the marine platform and in fluid communication with the liquified natural gas floating storage unit.

4. The system of claim 2, wherein the source of natural gas comprises a natural gas pipeline.

5. The system of claim 2, further comprising a blended fuel liquefaction system on the marine platform in fluid communication with the blending unit; and
a liquified blended fuel floating storage unit moored adjacent the marine platform and in fluid communication with the blended fuel liquefaction system.

6. The system of claim 1, further comprising a regasification unit in fluid communication with each of the liquified ammonia floating storage unit and the at least one ammonia cracking system.

7. The system of claim 1, wherein the marine platform is a jack-up platform affixed to an ocean floor.

8. The system of claim 1, further comprising a pretreatment unit for converting liquified ammonia to gaseous ammonia prior to cracking, wherein the pretreatment unit is a heat exchanger having a liquid ammonia inlet in fluid communication the liquified ammonia floating storage unit, a gaseous ammonia outlet in fluid communication with the cracking reactor, a product gas inlet in fluid communication product gas outlet of the ammonia cracking system, and a product gas outlet in fluid communication with the hydrogen purification unit.

9. The system of claim 1, further comprising a pretreatment unit for converting liquified ammonia to gaseous ammonia prior to cracking, wherein the pretreatment unit is an expansion valve having a liquid ammonia inlet in fluid communication with the liquified ammonia floating storage unit and a gaseous ammonia outlet in fluid communication with the ammonia cracking system.

10. The system of claim 1, further comprising one or more electric generators driven by the combustion turbines.

11. The system of claim 1, wherein the conveyance system comprises a gas pipeline in fluid communication with the marine platform.

12. The system of claim 1, wherein the conveyance system is an electrical cable extending away from the marine platform.

13. A system for offshore marine production of fuel comprising:
a fixed marine platform attached to a seabed;
at least one ammonia cracking reactor on the fixed marine platform which produces a product gas mixture of at least hydrogen and nitrogen from gaseous ammonia, the ammonia cracking reactor comprising a dissociation vessel having a reaction chamber with a catalyst bed disposed therein, a gaseous ammonia inlet, a product gas outlet, and a heat source disposed to provide heat to the reaction chamber;
a pretreatment unit on the fixed marine platform, the pretreatment unit having a liquified ammonia inlet and a gaseous ammonia outlet, a product gas inlet and a product gas outlet, wherein the gaseous ammonia outlet is in fluid communication with the gaseous ammonia inlet of the dissociation vessel;
a liquified ammonia floating storage unit moored adjacent the fixed marine platform and in fluid communication with the liquified ammonia inlet of the pretreatment unit;
a cryogenic pump disposed to pump liquified ammonia from the liquified ammonia floating storage unit to the pretreatment unit;
one or more combustion turbines on the fixed marine platform and disposed to combust hydrogen from the ammonia cracking reactor, wherein the one or more combustion turbines are in thermal communication with the at least one ammonia cracking system;
one or more electric generators driven by the one or more combustion turbines; and
a seabed conveyance system extending away from the fixed marine platform,
wherein the one or more combustion turbines are the heat source for the at least one ammonia cracking reactor.

14. The system of claim 13, further comprising a hydrogen purification unit disposed on the fixed marine platform, the hydrogen purification unit having a purified hydrogen outlet in fluid communication with the one or more combustion turbines providing hydrogen as fuel to the one or more combustion turbines and a product gas inlet in fluid communication with the product gas outlet of the pretreatment unit.

15. The system of claim 13, wherein the conveyance system comprises an electrical cable.

16. The system of claim 13, further comprising plurality of wind turbines disposed in the vicinity of marine platform and electrically coupled to the ammonia cracking system.

* * * * *

UNITED STATES PATENT AND TRADEMARK OFFICE
CERTIFICATE OF CORRECTION

| | | |
|---|---|---|
| PATENT NO. | : 12,162,772 B2 | Page 1 of 1 |
| APPLICATION NO. | : 18/610757 | |
| DATED | : December 10, 2024 | |
| INVENTOR(S) | : Svein Borge Hellesmark and Göran Hermansson | |

It is certified that error appears in the above-identified patent and that said Letters Patent is hereby corrected as shown below:

In the Specification

Column 8, Line 30, change "cither" to -- either --

Column 15, Line 8, change "cither" to -- either --

Column 15, Line 35, change "cither" to -- either --

Signed and Sealed this
Twenty-eighth Day of January, 2025

Coke Morgan Stewart
*Acting Director of the United States Patent and Trademark Office*